United States Patent [19]
Nagagata et al.

[11] Patent Number: 4,958,268
[45] Date of Patent: Sep. 18, 1990

[54] SWITCHING POWER SUPPLY

[75] Inventors: Nobuyoshi Nagagata, Kadoma; Osamu Hiromura, Yawata, both of Japan

[73] Assignee: Matsushita Electric Industrial Co., Ltd., Osaka, Japan

[21] Appl. No.: 333,310

[22] Filed: Apr. 5, 1989

[30] Foreign Application Priority Data

| Apr. 5, 1988 | [JP] | Japan | 63-83327 |
| Apr. 28, 1988 | [JP] | Japan | 63-106392 |
| Jun. 9, 1988 | [JP] | Japan | 63-142117 |
| Dec. 12, 1988 | [JP] | Japan | 63-313387 |

[51] Int. Cl.$^5$ .......................................... H02M 3/335
[52] U.S. Cl. ........................................ 363/16; 363/19; 363/97
[58] Field of Search ............................. 363/16, 18–21, 363/89, 95, 97, 131, 127

[56]         References Cited
U.S. PATENT DOCUMENTS

| 3,986,097 | 10/1976 | Woods | 307/64 |
| 4,272,805 | 6/1981 | Iguchi et al. | 363/19 |
| 4,399,499 | 8/1983 | Butcher et al. | 363/127 |
| 4,605,999 | 8/1986 | Bowman et al. | 363/19 |
| 4,736,151 | 4/1988 | Dishner | 363/16 |

FOREIGN PATENT DOCUMENTS 0013332  7/1979  European Pat. Off. .
0025376  3/1981  Japan ........................... 363/19

OTHER PUBLICATIONS

Regelungstechnik. vol. 30, No. 4, Apr. 1982, MUNCHEN DE pp. 111–120; Von H. Weingarten: "Das Stationare Verhalten von Durchfluss–und Sperrwandler".

Primary Examiner—Peter S. Wong
Attorney, Agent, or Firm—Stevens, Davis, Miller & Mosher

[57]              ABSTRACT

A switching power supply comprises first switching circuit for making an input voltage on and off, a transformer having a primary winding connected in series with the first switching circuit, first rectifying and smoothing circuit connected to a secondary winding of the transformer and a second switching circuit for releasing the output of the rectifying and smoothing circuit back to the secondary winding of the transformer during the off-period of the first switching circuit. The switching power supply may further comprise a control circuit for controlling on or off the second switching circuit in response to the output of the first rectifying and smoothing circuit. The power supply may alternatively comprise a second rectifying and smoothing circuit connected to additional secondary winding to control on or off of the first switching circuit. Thus a stabilized switching power supply is provided with lower power loss, higher efficiency and lower noise.

10 Claims, 16 Drawing Sheets

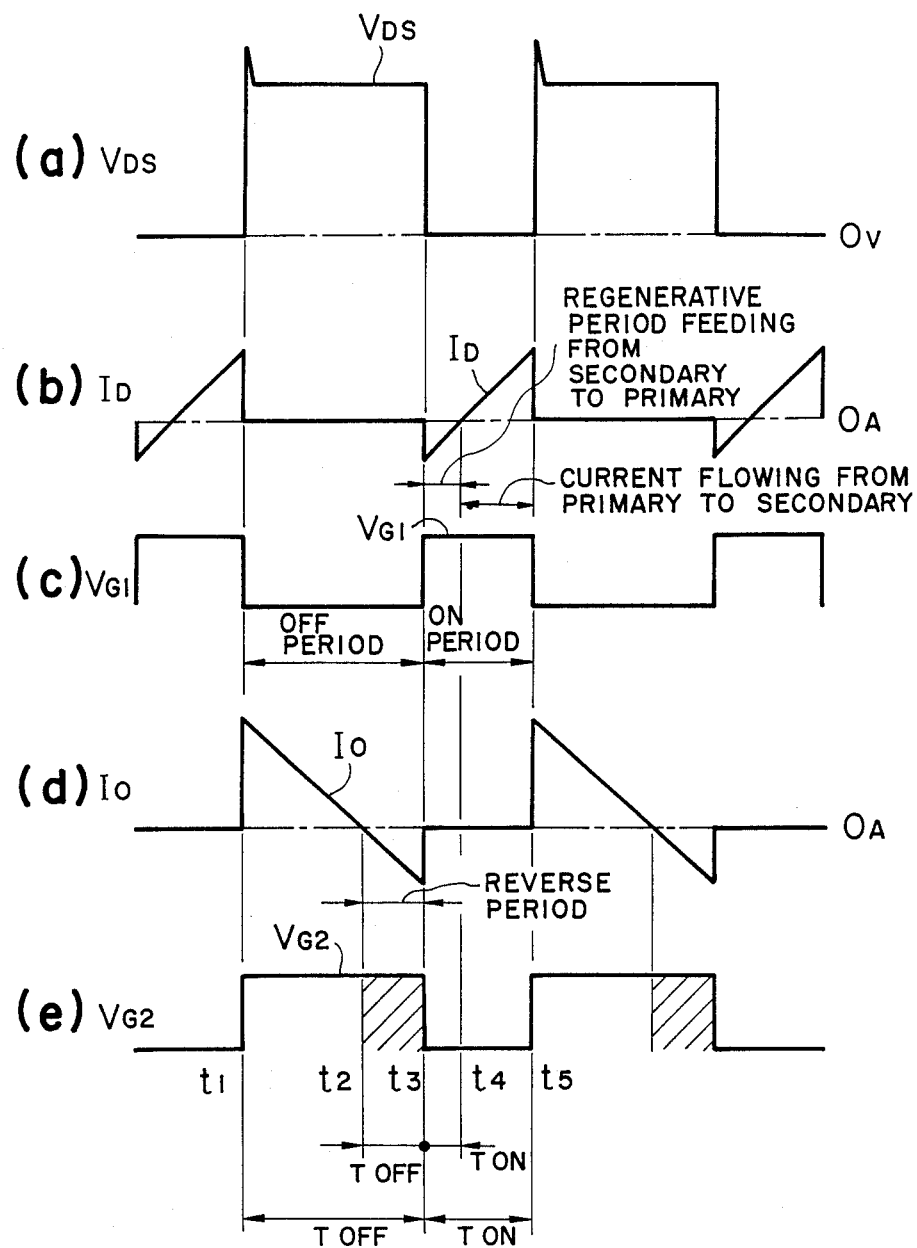

SWITCHING POWER SUPPLY

BACKGROUND OF THE INVENTION

This invention relates to a switching power supply for supplying DC stabilized voltages to industrial and consumer equipment.

A conventional switching power supply has the arrangement shown in FIG. 22. In FIG. 22, there is shown a DC power supply 1 which is obtained by rectifying and smoothing an AC voltage or formed of a battery. This DC power supply is connected between input terminals 2, 2' so as to supply a positive voltage to the input terminal 2 and a negative voltage to the input terminal 2'. Shown at 3 is a transformer which has one end of a primary winding 3a connected to the input terminal 2, the other end thereof connected through a switching element 4 to the input terminal 2', one end of a secondary winding 3c connected to an output terminal 11', the other end thereof connected through a diode 7 to an output terminal 11, one end of a bias winding 3b connected to the input terminal 2', and the other end thereof connected to a synchronizing oscillation control circuit 13. The switching element 4 is turned on and off when supplied at its control terminal with an on-off signal from the synchronizing oscillation control circuit 13, thereby interrupting the input voltage to the primary winding 3a. The synchronizing oscillation control circuit 13 operates to change the on-period of the element 4 by the output signal from insulating transmission means 14 such as photocouplers and keeps the off-state until the voltage across the bias winding 3b is reversed in its polarity. The rectifying diode 7 has its anode connected to one end of the secondary winding 3c and its cathode connected to the output terminal 11. Shown at 9 is a smoothing capacitor, which is connected between the output terminals 11, 11'. The rectifying diode 7 rectifies the voltage induced in the secondary winding 3c connected between the output terminals 11, 11' and the smoothing capacitor 9 acts to smooth the rectified voltage and to supply it to the output terminals as the output voltage. Shown at 15 is an error amplifier which compares a reference voltage 16 and the output voltage between the output terminals 11, 11', amplifies the compared signal and supplies it to the insulating transmission means 14. The insulating transmission means 14 acts to insulate between the primary and secondary windings and to transmit the signal from the error amplifier 15 to the synchronizing oscillation control circuit 13. The operation of this conventional example will be described below.

The input voltage supplied from the DC power supply 1 which is connected between the input terminals 2, 2', when the switching element 4 is turned on by the on-signal from the synchronizing oscillation control circuit 13, is supplied across the primary winding 3a of the transformer 3 in the on-period to allow a primary current to flow in the primary winding, this causing magnetic flux in the transformer 3 so that energy is stored in the transformer 3. At this time, a voltage is induced in the second winding 3c of the transformer 3 so as to bias the rectifying diode 7 in the reverse direction. When the switching element 4 is turned off by the off-signal from the synchronizing oscillation control circuit 13, a flyback voltage is generated in the primary winding 3a and at the same time, another flyback voltage is generated in the secondary winding 3a so as to forward-bias the rectifying diode 7. Therefore, the energy stored in the transformer 3 is released in the form of a secondary current in the secondary winding 3c. This current is rectified by the smoothing capacitor 9 to produce the output voltage which appears between the output terminals 11, 11'. When the energy stored in the transformer 3 is all released, the flyback voltages in the primary and secondary windings 3a, 3c disappear, and ringing is caused by the resonant voltage depending on the inductance and distributed capacitance of each winding. A similar voltage is also generated across the bias winding 3b of the transformer 3, and tends to change to the polarity opposite to that of the flyback voltage. The change of polarity is transmitted to the synchronizing oscillation control circuit 13, again turning on the switching element 4. Repetition of these operations provides a continuous output voltage from the output terminals 11, 11'.

Moreover, the operation in which the output voltage is controllably stabilized will be described in detail with reference to FIG. 23. Shown in FIG. 23 at (a) is a voltage waveform $V_{DS}$ across the switching element 4, at (b) is a primary current $I_D$ which flows in the primary winding 3a, at (c) is a drive pulse waveform $V_G$ from the synchronizing oscillation control circuit 13 and at (d) is a secondary current waveform $I_O$ which flows in the secondary winding 3c. In this figure, the solid lines indicate a so-called over-load time in which a large amount of output current $I_{OUT}$ flows out of the output terminals 11, 11', and the broken lines indicate a so-called light-load time in which a small amount of output current $I_{OUT}$ flows out of the terminals. In general, the output current $I_{OUT}$ is expressed by $$I_{OUT} = \frac{1}{2} \times \frac{N_S}{N_P} \times \frac{1}{L_S} \times V_{IN} \times \frac{T_{ON}^2}{T}$$

the output voltage $V_{OUT}$ by $$V_{OUT} = V_{IN} \times \frac{N_S}{N_P} \times \frac{1}{L_S} \times \frac{T_{ON}}{T_{OFF}}, \text{ and}$$

the switching frequency $f$ by $$f = \frac{1}{T_{ON} + T_{OFF}} = \frac{1}{T}$$

where $N_S$ is the number of turns of the secondary winding 3c, $N_P$ is the number of turns of the primary winding 3a, $L_S$ is the inductance of the secondary winding 3c, $V_{IN}$ is the input voltage supplied from the DC power supply 1, TON is the on-period of the switching element 4, $T_{OFF}$ is the off-period of the switching element 4 and T is the oscillation period.

The output voltage $V_{OUT}$ is compared with the reference voltage 16 in the error amplifier 15 and the compared result is supplied through the insulation transmission means 14 to the synchronizing oscillation control circuit 13, thereby controlling the on-period of the switching element 4. Therefore, the output voltage is always controlled to be constant with the on-period changed even though the output current $I_{OUT}$ and the input voltage $V_{IN}$ are changed. FIG. 23 shows such situations. However, since the change of the on-period results in the change of the off-period, the oscillation frequency $f$ is also changed as is obvious from the figure. Moreover, in order to prevent the on-period from being increased without limit by a over-current due to short-circuiting of the output terminals 11, 11' or the like, it is necessary that the synchronizing oscillation control circuit 13 has the function of limiting the maximum on-period or the primary current.

In the conventional switching power supply shown in FIG. 22, however, the voltage and current waveforms to be supplied when the switching element 4 is turned on and off are simultaneously changed while crossing each other due to the gradients depending on the response speed of the switching element 4, thus causing a large switching loss. In addition, if the switching loss is decreased by increasing the response speed of the switching element 4, the voltage and current waveforms become steeper, leading to an increase of the switching noise and the voltage and current spikes which are supplied to the switching element 4.

Recently, to solve such problems, various resonant-type switching power supplies utilizing LC resonance are proposed in which an inductance and capacitance are inserted on the switching circuit.

FIG. 24 shows an arrangement of a conventional resonant-type switching power supply. In FIG. 24, like elements corresponding to those in FIG. 22 are identified by the same reference numerals and will not be described. Referring to FIG. 24, there are shown an inductance 45 which is connected in series between the input terminal 2 and the primary winding 3a of the transformer 3, and a capacitor 41 which is connected in parallel with the switching element 4. These inductance 45 and the capacitance 41 constitute an LC resonant circuit. Shown at 5 is a diode which is connected across the switching element 4. This diode has its anode connected to the input terminal 2' and its cathode connected to one end of the primary winding 3a, so that when the energy stored in the inductance 45 is released back to the DC power supply 1, a current can be flow in the winding even under the off-state of the switching element 4. Shown at 42 is a synchronizing oscillation control circuit which generates an on-off control signal to the switching element 4 and detects the current in the diode 5 so that the on-period of the switching element 4 is changed and that the off-period is maintained until a current flows in the diode 5.

FIG. 25 shows operating waveforms at various points. In FIG. 25, at (a) is shown the voltage waveform VDS across the switching element 4, at (b) a current waveform $I'_{DS}$ which flows in the switching element 4 and in the diode 5, at (c) a drive pulse waveform $V_{G1}$ from the synchronizing oscillation control circuit 42, at (d) a current waveform $I'_c$ flowing in the capacitor 41, at (i) a secondary current waveform $I_O$ flowing in the secondary winding 3c, and (j) an induced voltage waveform $V_O$ across the secondary winding 3c. As will be understood from the operating waveforms, energy is stored in the transformer 3 and inductance 45 in the on-period of the switching element 4, while in the off-period, the energy stored in the transformer 3 is released through the secondary winding 3c to the output terminals 11, 11' and the energy stored in the inductance 45 is released to charge the capacitor 41. As a result, a sine-wave voltage vibrating at a resonant frequency, $f_C \approx \frac{1}{2}\pi\sqrt{LC}$ determined by the inductance value L of the inductance 45 and the capacitance value c of the capacitor 41, is generated across the capacitor 41. Moreover, the vibrating sine wave voltage vibrates about the sum of the input voltage of the DC power supply 1 and the flyback voltage induced in the primary winding 3a. Thus, the values of the inductances 45 and capacitor 41 and the on-period are set so that the amplitude becomes much larger than the sum of the input voltage and the flyback voltage, causing the voltage across the capacitor 41 to be negative. This negative-voltage period causes the voltage across the capacitor 41 to be zero and a current is flowed in the inductance 45 through the diode 5. At this time, the switching element 4 is turned on by the synchronizing oscillation control circuit 42, but no discharge current flows from the capacitor 41 to the switching element 4, thus the so-called zero-cross switching being caused in which the switching element is in the on-state with zero voltage applied there across. This operation is repeated to supply the output voltage to the output terminals 11, 11'. In this resonant-type switching power supply, the voltage waveform (current waveform or both voltage and current waveforms depending on the system) applied when the switching element 4 is turned on and turned off gently changes with a sine-wave gradient irrespective of the response speed of the switching element 4. Thus, even if the current waveform is abruptly changed, the switching loss is small and since the voltage waveform is a sine wave, the switching noise is very little. In this resonant-type switching power supply, however, when the switching element 4 is turned on, the above zero-cross switching must be made, otherwise the capacitor 41 would be shorted through the switching element 4, thus breaking the switching element 4, or the switching loss would be suddenly increased or the switching noise would be increased. Therefore, it is very difficult to control the output voltage to be always constant against a wide range of input voltage and output current variations while the zero-cross switching is being secured. Also, other effective means have not yet been found so far. In other words, the minimum value of the on-period is limited for assuring the zero-cross switching and the off-period TOFF is also limited since the resonant frequency $f_C$ is maintained to be constant for assuring the zero-cross switching, or the off-period must be restricted in the range of $$\frac{1}{2f_c} < T_{OFF} < \frac{1}{f_c}.$$

Thus, the control characteristic is not wide enough in the pulse-width control. Moreover, in the conventional system shown in FIG. 22 the voltage (or current-)waveform applied to the switching element 4 is rectangular, but in the resonant-type it is a sine wave, so that the peak value of the applied waveform increases. This follows that the switching element 4 is required to have a large capacity and that a large resonant current is flowed through the inductance 45 capacitor 41 and primary winding 3C to the DC power supply 1.

Moreover, FIG. 26 shows another conventional switching power supply arranged to have a plurality of secondary windings in the transformer 3 and rectifying and smoothing means provided in each of the secondary windings, thereby generating a plurality of output voltages. In FIG. 26, like elements corresponding to those in FIG. 22, are identified by the same reference numerals and will not be described. In FIG. 26, there is shown a second secondary winding 3f wound on the transformer 3. This secondary winding has its one end connected to an output terminal 62' and its other end connected to an output terminal 62 through a rectifying diode 60. There is also shown a capacitor 61 which is connected between the output terminals 62, 62' and serves to smooth the induced voltage in the secondary winding 3f and to supply the output voltage.

The operations of the error amplifier 15, reference voltage 16, insulation transmission means 14, and synchronizing oscillation control circuit 13 by which the output voltage $V_{OUT}1$ between the output terminals 62–62' is controlled to be stabilized have been mentioned with reference to FIGS. 22 and 23 and thus will not be described again. The output voltage $V_{OUT}2$ between the output terminals 11, 11' which is not directly controlled, or an un-controlled output is a voltage proportional to the voltage output VOUT 1, or is expressed as $$V_{OUT}2 = \frac{N_{S2}}{N_{S1}} \times V_{OUT}1$$

The stability of the output voltage $V_{OUT}2$ is not sufficiently high because the output current causes voltage drops chiefly across the impedance of the secondary winding, the operating impedance of the rectifying diode and the leakage inductance between the secondary windings 3c and 3f. In the above equation, $N_{S1}$ is the number of turns of the secondary winding 3f and $N_{S2}$ is the number of turns of the secondary winding 3c.

In this conventional arrangement of FIG. 22, in order to control the output voltage to be constant against the variations of the input voltage and output current, it is necessary to greatly change the oscillation frequency. However, since the upper limit of the oscillation frequency is determined by the operating frequency of the switching element 4, the response of the synchronizing oscillation control circuit 13 and of the control system and so on, the lower limit of the oscillation frequency must inevitably be lowered to widen the control range. Thus, the transformer 3 and the rectifying and smoothing circuits in the secondary winding, since they are designed for the lowest oscillation frequency, become large in their size and capacity, thus making the power supply be large-sized and expensive. In addition, since the control loop responds late to the transient variations of the output voltage, the output voltage has a transient variation. Particularly when the output voltage is transiently increased, the charge on the smoothing capacitor 9 is discharged through the output terminals 11, 11' in the form of the output current. Therefore, the discharge speed is slow when the output current is small, and hence it takes a long time for the output voltage to be stabilized, or the response of the output voltage to the transient change is very poor. Moreover, in order to protect the short circuit between the output terminals and the output current from over-current, it is necessary to provide a circuit for limiting the maximum value of the on-period. Also, for the insulation between the primary and secondary windings the insulation transmission means 14 such as a photocoupler is required to transmit a control signal. These requirements make the circuit arrangement complicated thereby increasing the cost. Moreover, in order to reduce the switching loss occurring when the switching element 4 is turned o and off thereby to make the high frequency operation possible, the response speed of the switching element 4 must be increased, thus increasing the switching noise. Consequently, the noise filter to be inserted in the input and output terminals for the purpose of preventing equipment from interfering with noise becomes large-sized. In addition, since the surge voltage and current to be applied to the switching element 4 are increased, a switching element of which capacity is excessively large is required. To solve these problems, if the rapid change of the turn-off waveform is suppressed, the turn-off loss and snubber-circuit loss increased, thus lowering the efficiency to an impractical extent. Another method for reducing both the switching loss and the switching noise at a time, or such resonant-type switching power supply as shown in FIG. 24 has been proposed, but has a difficulty in the stabilizing control of the output voltage to achieve the zero-cross switching. Also, since the voltage waveform or current waveform to be applied to the switching element 4 is sine wave which increases the peak value, the switching element 4 must have a large capacity and thus cannot be improved much in efficiency due to a large resonant current.

Moreover, the switching noise is caused not only in the primary winding of the transformer, but also in the secondary winding. The switching noise in the secondary winding is large which is caused by the generation of ringing waveform due to the distributing capacitance between the leakage inductance (between the secondary winding and the primary winding a viewed from the secondary winding side) and the secondary winding, and by the recovery current of the rectifying diode, chiefly when the switching element 4 is turned off. To cope with these problems, a snubber circuit is connected across the secondary winding or the rectifying diode as in the primary winding. However, the snubber-circuit loss is increased and the current flowing in the snubber circuit is transmitted from the secondary winding of the transformer to the primary winding thus increasing the spike current to cause a large loss when the switching element 4 is turned off.

In the conventional arrangement having a plurality of secondary windings shown in FIG. 26, the detected and controlled outputs of the multiple outputs are always controlled to be stabilized, but the other un-controlled outputs are much affected by the variations of the output currents so as to slightly change. Particularly at the time of light load when the output current of the un-controlled output becomes small, inadequate coupling of the secondary winding of the transformer which contributes to the controlled output, to the other secondary windings which are associated with the un-controlled outputs will cause the un-controlled output to be easily affected by the spike voltage produced from the leakage inductance of the transformer so that the output voltage of the uncontrolled output is greatly increased. In this case, the greater the output current of the controlled output and the less the output current of the un-controlled output, the more the output voltage of the un-controlled output will increase. In order to prevent the output voltage from increasing at the time of light load on the un-controlled output, a resistor or the like is connected between the output terminals of the un-controlled output so that the bleeder current flows therein not to cause light load, or a regulator circuit is connected before the output. However, the bleeder current and the regulator circuit cause losses, thus lowering the efficiency of the switching power supply.

SUMMARY OF THE INVENTION

Accordingly, it is an object of the invention to improve the transient response of the output voltage and reduce the size and cost of such a switching power supply.

It is another object of the invention to permit the switching power supply to stably operate at high frequencies, the switching loss to be reduced and also the switching noise to be decreased.

It is still another object of this invention to reduce the loss in the multiple outputs having a plurality of secondary windings, thus suppressing the output voltage from increasing at the time of light load on the un-controlled output so that the switching power supply can be operated at a high efficiency.

According to one typical aspect of this invention, there is provided a switching power supply comprising: a first switching means which, when turning on, supplies an input voltage to a primary winding of a transformer so that a primary current flows in the primary winding, thus storing energy in the transformer, and when turning off, allows the energy stored in the transformer to be released from a secondary winding of the transformer as a secondary current; the transformer of which the primary winding is connected to the first switching means; rectifying and smoothing means connected to the secondary winding of the transformer so as to rectify and smooth the secondary current to produce an output voltage; and second switching means connected in parallel with the rectifying means so as to supply the output voltage to the secondary winding of the transformer after the energy stored in the transformer is all released from the secondary winding of the transformer; whereby the output voltage is controlled by changing the period in which the output voltage is supplied to the secondary winding of the transformer by the second switching means.

According to another aspect of the invention, there is provided a switching power supply which further comprises a capacitor connected across either one or both of the first and second switching means.

According to still another aspect of this invention, there is provided a switching power supply of which the transformer has a plurality of secondary windings from which a plurality of output voltages are supplied through the rectifying and smoothing means, and wherein the on period of the first switching means is controlled so that at least one of the output voltages can be stabilized, and at least one of the other output voltages not stabilized is supplied through the second switching means to the secondary winding of the transformer when the first switching means is turned off.

With this arrangement, the energy stored in the transformer when the primary current flows in the primary winding during the on-period is released through the secondary winding as the secondary current to the output during the off-period, and the excess energy of the released energy is again stored by flowing a secondary current in the secondary winding in the opposite direction and released through the primary winding as a primary current in the reverse direction, thereby controlling the output. That is, the secondary current flowing in the secondary winding in the reverse direction is controlled to thereby control the energy released back to the primary winding side, and control the energy from the output, maintaining the output voltage constant. In addition, by storing the released-back energy in the capacitor connected across the respective switching means on the primary winding and the secondary winding side and discharging the capacitor it is possible to prevent the voltage waveform at the time of turning off of the switching means and the current waveform at the time of turning on from short rapidly changing and to reduce the switching loss and the switching noise.

Moreover, according to a further aspect of this invention, since the released back energy is released back to the DC power supply from the unstabilized output of the plurality of outputs supplied from a plurality of secondary windings of the transformer and the rectifying and smoothing means, only the energy released back through the primary winding is always related to the load even when the load is reduced to a light load, so that the output voltage on such a light load can be prevented from increasing and that no loss is produced because the released back energy is again fed back to the DC power supply.

BRIEF DESCRIPTION OF THE DRAWINGS

FIGS. 2 to 4 are waveform diagrams showing the operating waveforms in the circuit arrangement of this invention in FIG. 1.

DESCRIPTION OF THE PREFERRED EMBODIMENTS

Figure 1:
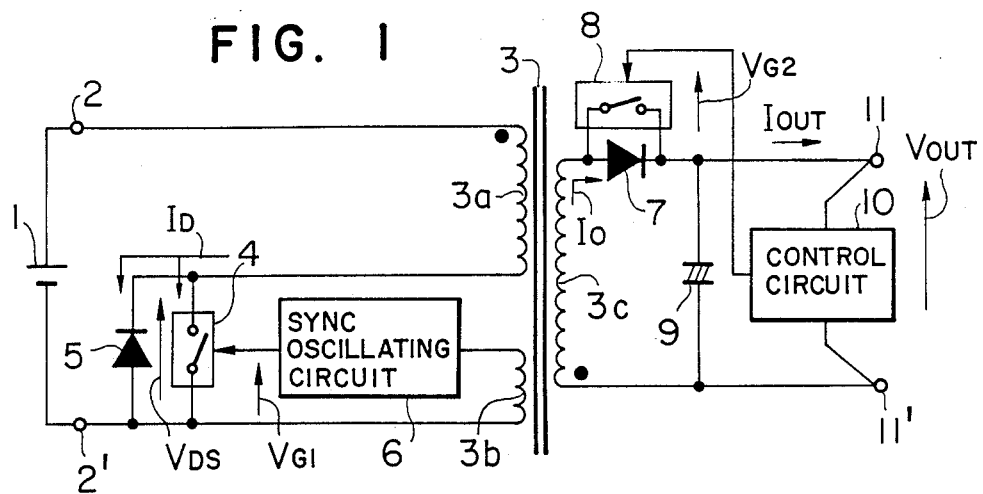
FIG. 1 is a circuit diagram of one embodiment of a switching power supply of this invention.
Figure 22:
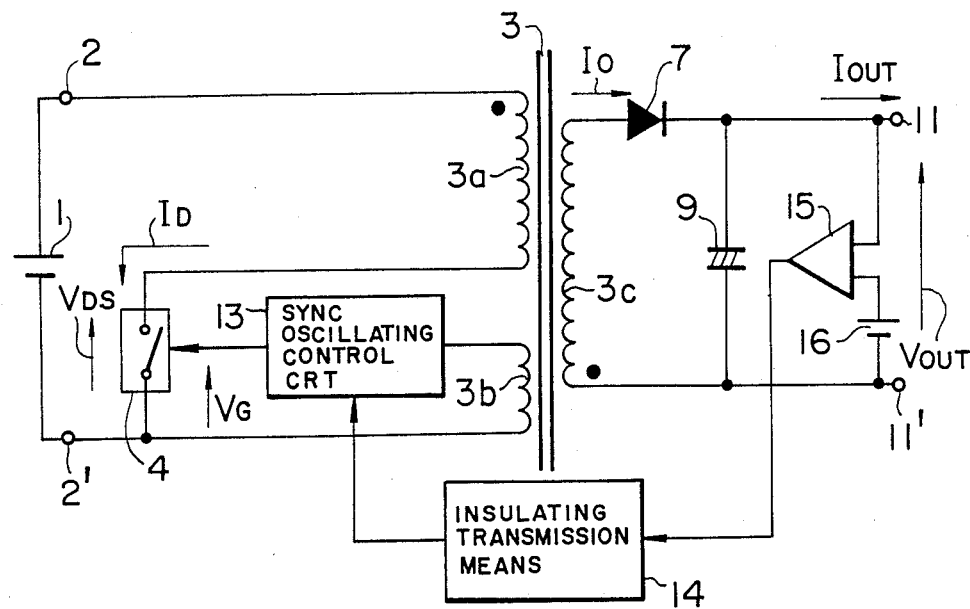
FIG. 22 is a circuit diagram of a conventional switching power supply.

FIG. 1 is a circuit diagram of one embodiment of a switching power supply of the invention. In FIG. 1, like elements corresponding to those in FIG. 22 are identified by the same reference numerals and will not be described. Referring to FIG. 1, there are shown the DC power supply 1, the input terminals 2, 2', the transformer 3 having the primary winding 3a, secondary winding 3c and the bias winding 3b, the switching element 4 as the first switching means, the rectifying diode 7, the smoothing capacitor 9, the output terminals 11, 11', and the diode 5. When the energy stored in the transformer 3 is released through the primary winding 3a to the DC power supply 1, this diode 5 allows the current in the primary winding 3a to flow therein even if the switching element 4 is in the off-state. That is, this diode 5 has its anode connected to the input terminal 2' and its cathode connected to one end of the primary winding 3a so that it is connected in parallel with the switching element 4. Shown at 6 is the synchronizing oscillation circuit which causes the switching element 4 to turn on in a predetermined on-period and to turn off until the induced voltage in the winding 3b is reversed in its polarity. The repetition of the on-and off-operations makes the oscillation continue. Numeral 8 denotes a second switching element as the second switching means. After the energy stored in the transformer when the switching element 4 is in the on-state is released through the secondary winding 3c to the smoothing capacitor 9 from the rectifying diode 7 or the second switching element 8 in the off-period of the switching element 4, the secondary current is reversely flowed from the smoothing capacitor 9 through the secondary switching element 8 to the secondary winding 3c in a period controlled by control circuit 10. Shown at 10 is the control circuit which detects the output voltage between the output terminals 11, 11', compares it with the internal reference voltage, and changes the reverse current period in which the secondary current flows in the switching element 8.

The operation of the embodiment will be described in detail with reference to FIGS. 1 and 2.

In FIG. 2 at (a) is shown the voltage waveform $V_{DS}$ across the switching element 4, at (b) the primary current $I_D$ flowing in the primary winding 3a, at (c) the drive pulse waveform $V_{G1}$ from the synchronizing oscillation circuit 6, at (d) the secondary current waveform $I_O$ flowing in the secondary winding 3c, at (e) the drive pulse waveform $V_{G2}$ to the secondary switching element 8 wherein the shaped area in the off-period shows the reverse current period in which the secondary current flows in the secondary winding 3c. During the on-period of the switching element 4 which operates in the on-period determined by the synchronizing oscillation circuit 6, the primary current flows in the primary winding 3a to generate magnetic flux in the transformer 3, thereby storing energy therein. At this time, a voltage is induced in the secondary winding 3c of the transformer 3, reverse biasing the rectifying diode 7, and the secondary switching element 8 is turned off. When the switching element 4 is turned off by the off-signal from the synchronizing oscillation circuit 6, a flyback voltage is induced in the primary winding 3a and at the same time a flyback voltage is caused in the secondary winding 3c, thereby forward-biasing the rectifying diode 7. Thus, the energy stored in the transformer 3 is released through the secondary winding 3c in the form of secondary current and smoothed by the smoothing capacitor 9, thus appearing as an output between the output terminals 11, 11' At this time, although the secondary switching element 8 is turned on by the control circuit 10, the secondary current in either element does not cause any trouble in operation. When the energy stored in the transformer 3 is all released so that the secondary current becomes zero, the voltage across the smoothing capacitor 9, or the output voltage is supplied through the secondary switching element 8 already in the on-state, to the secondary winding 3c, so that the secondary current flows from the smoothing capacitor 9 in the reverse direction, generating magnetic flux in the reverse direction to store energy in the transformer 3. Since in this state the voltage induced in each winding of the transformer 3 is not changed in its polarity, the flyback voltage in the bias winding 3b is not also changed, and thus the synchronizing oscillation circuit 6 maintains the switching element 4 in the off-state. The control circuit 10 controls the secondary switching element 8 to be in the on-state. When the secondary switching element 8 is turned off, the voltage induced in each winding of the transformer 3 is reversed in its polarity, so that the voltage induced in the secondary winding 3c reverse-biases the rectifying diode 7. Also, since the secondary switching element 8 is in the off-state, current does not flow in the secondary winding, and the induced voltage in the primary winding 3a is in the direction in which a negative voltage is applied to the connection point between the switching element 4 and one end of the primary winding and a positive voltage to the connection point between the input terminal 2 and the other end of the winding. Thus, the primary current flows through the diode 5 to charge the DC power supply 1 so that the energy stored in the transformer 3 during the off-period is released back to the DC power supply 1. Since at this time the induced voltage in the bias winding 3b is reversed in its polarity, the synchronizing oscillation circuit 6 turns the switching element 4 on, and in this case the primary current in either element does not cause any trouble in operation. When the energy stored in the transformer 3 in the off-period is all released so that the primary current becomes zero, the primary current flows through the switching element 4 already in the on-state, in the direction opposite to the indicated direction, to generate magnetic flux in the transformer 3, thus energy being stored in the transformer. Under this condition, the polarity of the induced voltage in each winding of the transformer 3 is not changed and thus the synchronizing oscillation circuit 6 maintains the switching element 4 in the on-state. When the switching element 4 operating in the on-state determined by the synchronizing oscillation circuit 6 is turned off, the energy stored in the transformer 3 is released through the secondary winding 3c as the secondary current. By repeating these operations, the output voltage is continuously supplied from the output terminals 11, 11'.

The operation in which the output is controlled to be stabilized will be described in detail. FIG. 2 shows operating waveforms. The off-period t1 to t3 of the drive pulse waveform $V_{G1}$ from the synchronizing oscillation circuit 6 is represented by $T_{OFF}$, the reverse current period (t2 to t3) of the secondary current $I_O$ thereof by $T_{OFF}'$, the on-period (t3 to t5) by $T_{ON}$ and the released-back period (t3 to t4) of the primary current $I_D$ thereof by $T_{ON}'$. The output current $I_{OUT}$ from the output terminals 11, 11' is expressed as $$I_{OUT} = \frac{1}{2} \times V_{OUT} \times \frac{1}{L_S} \times \frac{T_{OFF}}{T} \times (T_{OFF} - 2T_{OFF}')$$

The output voltage $V_{OUT}$ is given as $$V_{OUT} = V_{IN} \times \frac{N_S}{N_P} \times \frac{T_{ON}}{T_{OFF}} = V_{IN} \times \frac{N_S}{N_P} \times \frac{T_{ON}'}{T_{OFF}'}$$
$$= V_{IN} \times \frac{N_S}{N_P} \times \frac{T_{ON} - T_{ON}'}{T_{OFF} - T_{OFF}'}$$

The oscillation frequency $f$ is expressed as $$f = \frac{1}{T_{ON} + T_{OFF}} = \frac{1}{T}$$

where $N_S$ is the number of turns of the secondary winding 3c, $N_P$ is the number of turns of the primary winding 3a, $L_S$ is the inductance value of the secondary winding 3c, $V_{IN}$ is the input voltage supplied from the DC power supply 1, $T_{ON}$ is the on-period of the switching element 4, $T_{OFF}$ is the off-period of the switching element 4 and T is the oscillation period.

Since the on-period $T_{ON}$ is maintained to be a constant value determined by the synchronizing oscillation circuit 6, the off-period $T_{OFF}$ is constant and the oscillation frequency is constant as long as the $V_{OUT}$ is constant. However, the reverse current period $T_{OFF}'$ can be changed by the secondary switching element 8 which is controlled by the control circuit 10. When the output current $I_{OUT}$ is changed, the reverse current period $T_{OFF}'$ is changed as expressed as $$I_{OUT} = K \times (T_{OFF} - 2T_{OFF}')$$

$$(K = \frac{1}{2} \times V_{OUT} \times \frac{1}{L_S} \times \frac{T_{OFF}}{1},$$

which is constant if the output voltage $V_{OUT}$ is constant)

Moreover, when the input voltage $V_{IN}$ is changed, the reverse current period $T_{OFF}'$ is changed as $$V_{OUT} = V_{IN} \times \frac{N_S}{N_P} \times \frac{T_{ON}'}{T_{OFF}'}$$

Thus, the control circuit 10 controls the on-period of the secondary switching element 8, thereby changing the reverse current period $T_{OFF}'$ so that the output voltage $V_{OUT}$ is controlled to be constant at all times.

Figure 4:
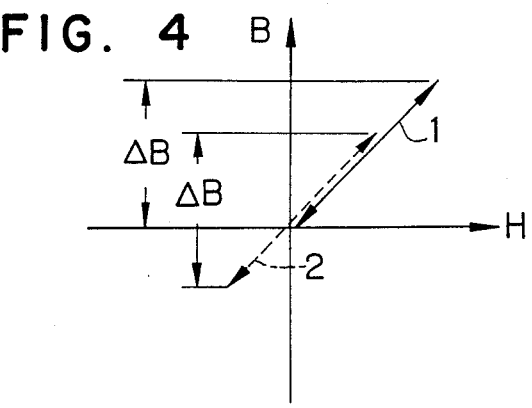
Figure 3:
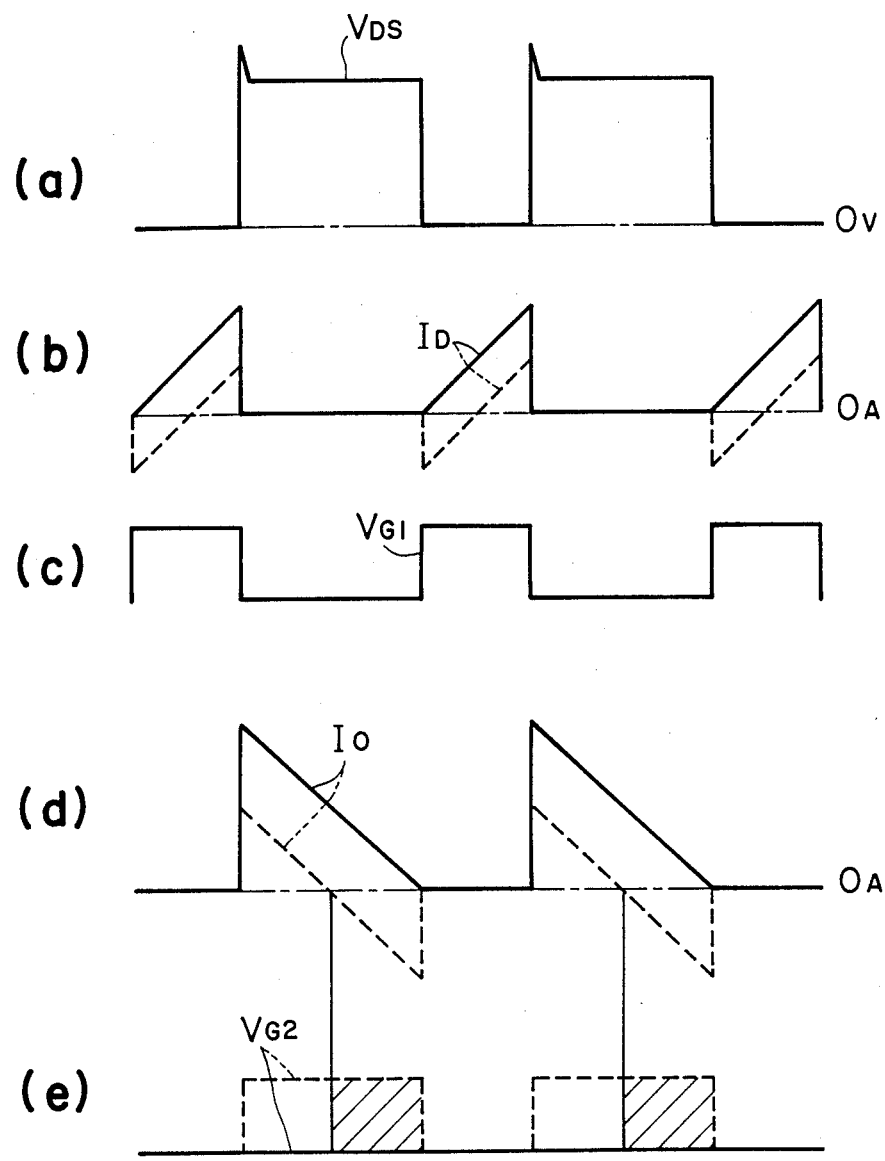

FIG. 3 shows operating waveforms with the output current $I_{OUT}$ changed, and FIG. 4 shows the B-H curve for indicating the magnetic flux change in the transformer 3 at that time. In FIG. 3, like elements corresponding to those in FIG. 2 are identified by the same reference numerals and will not be described. In FIG. 3, the solid line indicates the so-called maximum loading time when the maximum value of the output current $I_{OUT}$ flows from the output ends 11, 11', and the broken line indicates the so-called no-loading time when the output current $I_{OUT}$ is zero. In FIG. 4, the solid line indicates the magnetic flux change at the time of the no-load. Since the $T_{ON}$-period and $T_{OFF}$-period are constant under constant input voltage even if the output current is changed, the magnetic flux change width, $\Delta BY$ is always constant.

Figure 5:
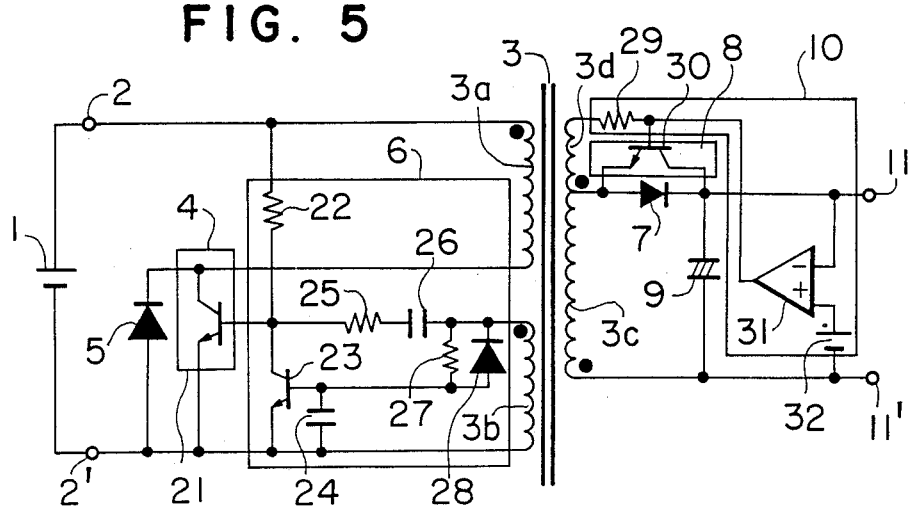
FIGS. 5 to 9 are circuit diagrams of other embodiments of the switching power supply according to this invention.

FIG. 5 shows another embodiment of this invention. In FIG. 5, like elements corresponding to those in FIG. 1 are identified by the same reference numerals and will not be described. There are shown a secondary bias winding 3d wound on the secondary winding 3c of the transformer 3, bipolar transistors (hereinafter, abbreviated BPT) 21, 23 and 30, resistors 22, 25, 27 and 29, capacitors 24 and 26, a diode 28, an error amplifier 31, and a reference voltage 32. In this embodiment, the BPT 21 is used as the switching element 4, and the BPT 30 as the second switching element 8. The circuits constituting the synchronizing oscillation circuit 6 are operated as described below. When the BPT 21 is turned on, the induced voltage in the biasing winding 3b causes the drive current to flow through the series circuit of the resistor 25 and the capacitor 26 to the BPT 21, thus the BPT 21 being maintained in the on-state. In the on-period, the induced voltage in the bias winding 3b which is proportional to the input voltage charges the capacitor 24 through the resistor 27, increasing the voltage across the capacitor 24. This voltage drives the base of the BPT 23, turning the BPT 23 on so that the BPT 21 is turned off since the base of the BPT 21 is shorted. A flyback voltage proportional to the output voltage induced in the bias winding 3b in the off-period of the BPT 21 charges the capacitor 24 through the diode 28. The resulting voltage across the capacitor 24 reverse-biases the base of the BPT 23. In the on-period of the element 4 the capacitor 24 is reversely charged until forwardly biasing the base of the BPT 23. Therefore, the on-period is determined by a period until the BPT 23 is turned on, and maintained substantially constant although it is slightly changed by the input voltage and output voltage. As to the operation of the circuits constituting the control circuit 10, a flyback voltage is induced in the secondary bias winding 3d in the off-period of the BPT 21, and supplied through the resistor 29 to the base of the BPT 30, turning it on. The energy stored in the transformer 3 during the on-period is released through the second winding 3c as the secondary current during the off-period. Then, the secondary current flows through the BPT 30 already in the on state, from the capacitor 9 into the secondary winding 3c in the reverse direction. The secondary current $I_O'$ linearly increases as determined by the equation.

$$I_O' = \frac{V_{OUT}}{L_S} \times T_{OFF}'$$

In addition, since the base current $I_B$ to the BPT 30 is from the error amplifier 31 which detects the output voltage and compares it with the reference voltage 32, the secondary current $I_O'$ is limited to a value determined by the equation, $$I_O' \times I_B' \times h_{FE}$$

The reverse current period $T_{OFF}'$ can be changed by the base current $I_{BY}'$ to the BPT 30 as $$I_{OFF}' = \frac{L_S}{V_{OUT}} \times h_{FE} \times I_B'$$

When the secondary current is limited to a constant value from a linear increase, no induced voltage is induced in the secondary bias winding 3d. Thus, the BPT 30 swiftly turns off and at the same time the polarity of the induced voltage in each winding of the transformer 3 is inverted, so that a voltage is induced in the bias winding 3b to forward-bias the base of the BPT 21, again turning on the BPT 21. Repetition of the above operations maintains the oscillation, controlling the output voltage. The resistor 22 supplies a small current to the base of the BPT 21, to actuate it to start.

Figure 6:
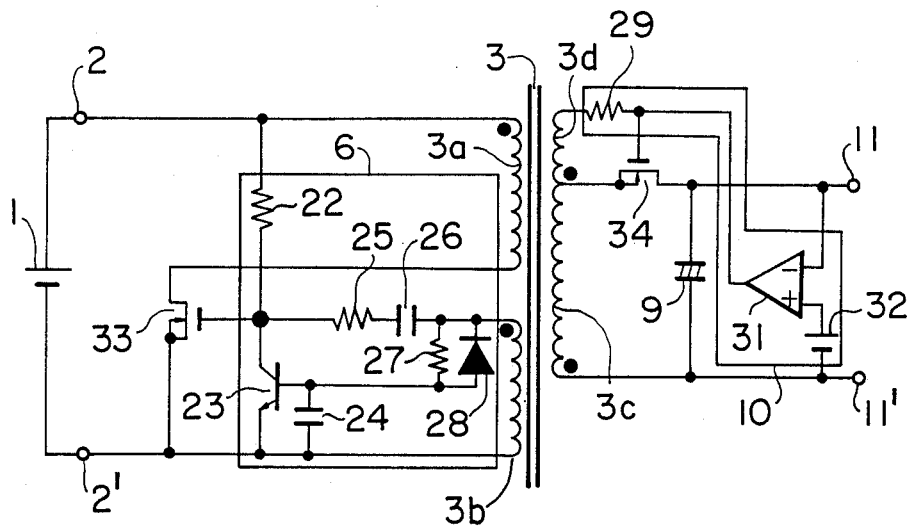

FIG. 6 shows still another embodiment of this invention. In this embodiment, the switching element 45 and the secondary switching element 8 in FIG. 5 are formed of field effect transistors (hereinafter, abbreviated FET). Since this embodiment utilizes the body diode parasitically built in the FET, it does not include the diode 5 and the rectifying diode 7. The operation of this embodiment is the same as that of FIG. 5, and thus will not be described. Shown at 33 and 34 are FETs. The resistor 22 supplies a voltage to the gate of the FET 33, thereby starting it.

Figure 7:
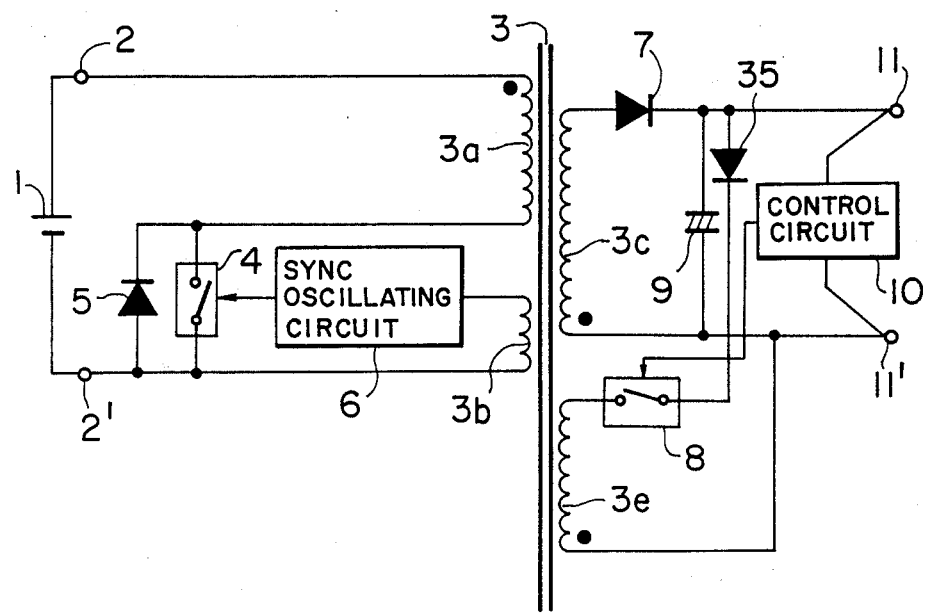

FIG. 7 shows a further embodiment of this invention. In this embodiment a feed-back winding 3e is separately provided on the transformer 3 shown in FIG. 1. The energy stored in the transformer 3 through the secondary winding 3c of the transformer 3 is released to the output terminal 11, 11', and the series circuit of the feed-back winding 3e, diode 35 and secondary switching element 8 supplies output voltage. Thus, energy is again stored in the transformer 3 and released back to the DC power supply 1 through the primary winding 3a of the transformer 3. The operation of this embodiment is the same as in FIG. 1 and will not be described. In this case, however, the number of turns of the secondary winding 3c must be equal to or smaller than that of the feed-back winding 3e. In particular, if the numbers of turns of both windings are equal, the diode 35 can be omitted.

Figure 8:
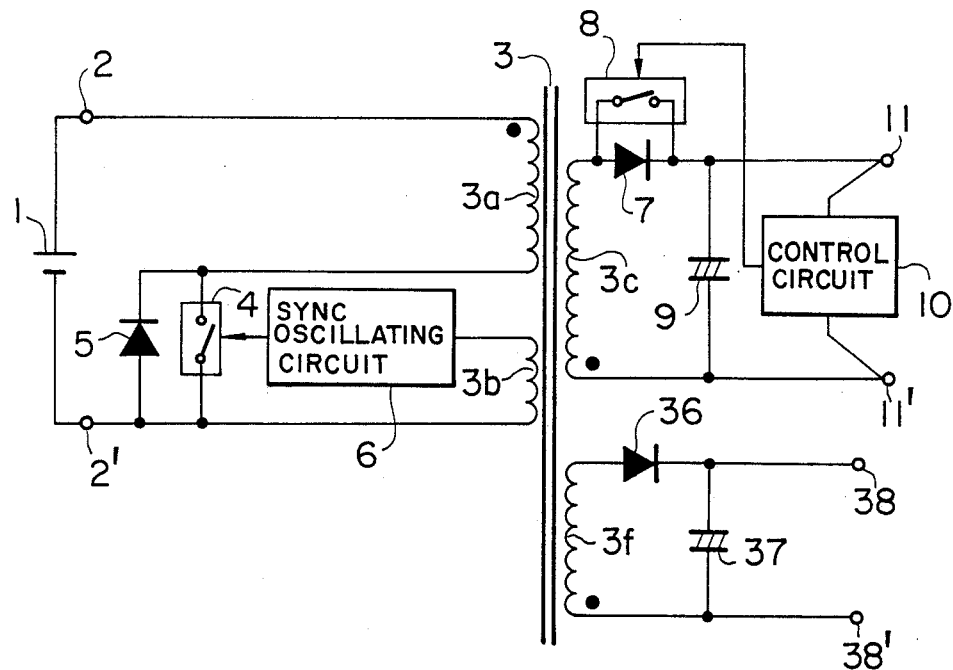

FIG. 8 shows still further embodiment of this invention. In this embodiment, a multiple output winding 3f is additionally provided on the transformer 3 shown in FIG. 1 to increase the output terminal number. A second output voltage rectified and smoothed through a rectifying diode 36 and a smoothing capacitor 37 connected to the multiple output winding 3f is supplied through output terminals 38, 38'. The operation is the same as in FIG. 1 and will not be described. For more output voltage terminals, more separate windings can be provided similarly as above.

Figure 9:
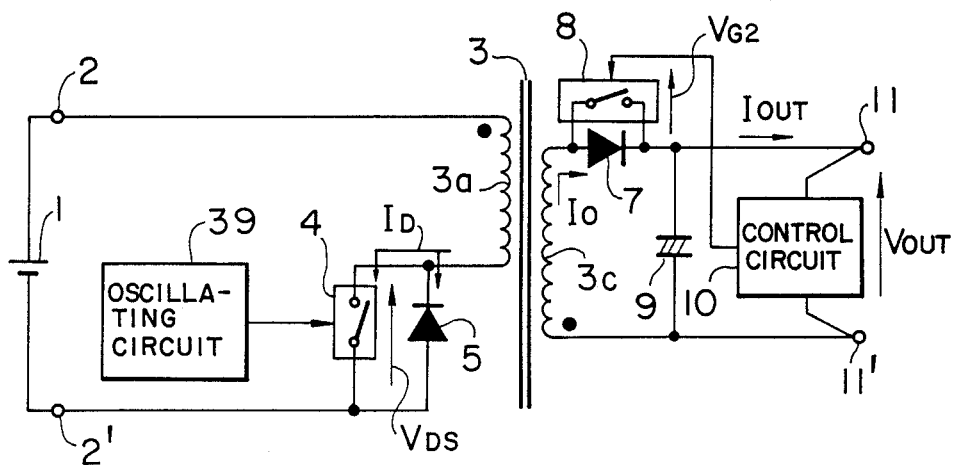
Figure 10:
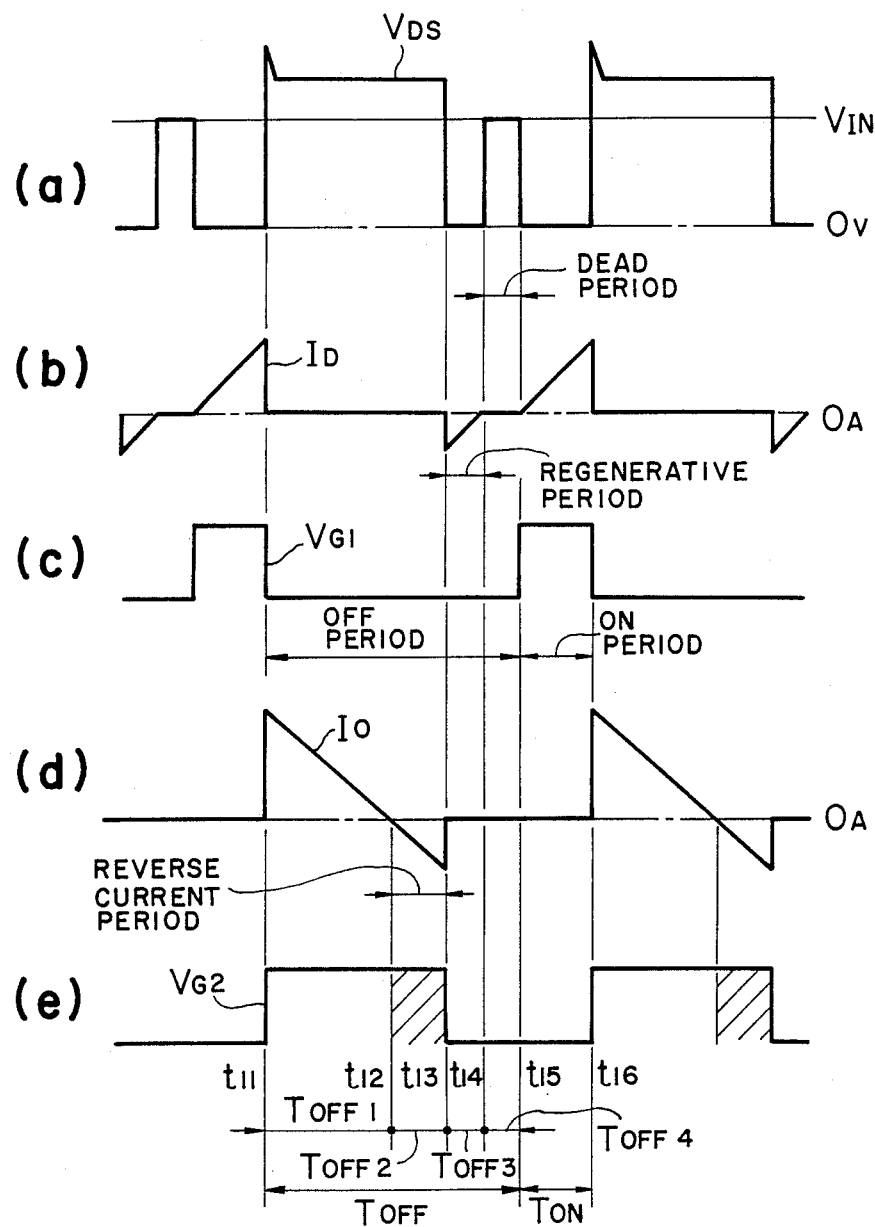
FIG. 10 is a waveform diagram showing the operating waveforms in the circuit arrangement of the invention in FIG. 9.

FIG. 9 shows further embodiment of this invention. In this embodiment, the synchronizing oscillation circuit 6 in FIG. 6 is replaced by a separately excited oscillation circuit 39, and the bias winding 3b is removed from the transformer 3. The separately excited oscillation circuit 39 repeats on and off operations at a predetermined constant frequency and drives the switching element 4. In FIG. 9, like elements corresponding to those in FIG. 1 are identified by the same reference numerals and will not be described. The operation of this invention will be described with reference to FIGS. 9 and 10. In FIG. 10, like elements corresponding to those in FIG. 2 are identified by the same reference numerals and will not be described. The energy stored in the transformer 3 during the on-period (t15 to t16) of the separately excited oscillation circuit 39 is to cause the following periods. The off-period t11 to t15 of the separately excited oscillation circuit 39 includes the period $T_{OFF1}$ (t11 to t12) in which part of the stored energy is released through the secondary winding 3c of the transformer 3 to the output voltage, the reverse current period $T_{OFF2}$ (t12 to t13) in which the output voltage is supplied through the secondary switching element 8 to the secondary winding 3c of the transformer 3, the released-back period $T_{OFF3}$ (t13 to t14) in which the energy stored in the transformer 3 through the primary winding 3a during the reverse current period $T_{OFF2}$ is released back to the DC power supply 1, and the dead period $T_{OFF4}$ (t14 to t15) in which nO magnetic flux is generated in the transformer 3 and the voltage across the switching element 4 is the same as the input voltage $V_{IN}$ of the DC power supply 1. Thus, the output voltage is controlled by the same operation as in FIG. 1, but the off-period of the separately excited oscillation circuit 39 is necessary to be set so that the dead period $T_{OFF4}$ occurs.

Figure 11:
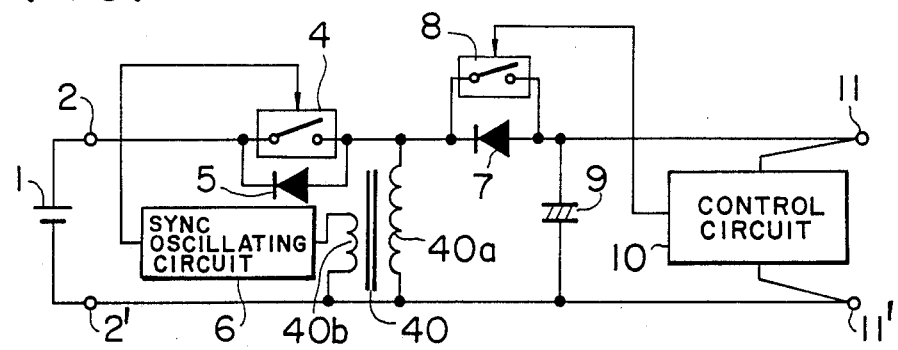
FIGS. 11 to 12 are circuit diagrams of other embodiments of the switching power supply of this invention.

FIG. 11 shows further embodiment of this invention. In this embodiment, the input-output insulation arrangement shown in FIG. 1 is replaced by a non-insulation arrangement, or the so-call back boost converter. The operation is the same as that in FIG. 1 and will not be described.

Shown at 40 is a choke transformer which is formed of a main winding 40a and a bias winding 40b. When the switching element 4 is turned on, a current flows from the input to the main winding 40a to store energy in the choke transformer 40. When it is turned off, the energy stored in the choke transformer 40 through the main winding 40a is released to the output. The bias winding 40b provides the on-state timing to the synchronizing bias winding 40b.

In this invention, against the overcurrent of output current the $T_{ON}$-period is always fixed to a constant value which is predetermined by the synchronizing circuit 6 and the separately excited oscillation circuit 39. The maximum output current is automatically limited, but changed with the change of input voltage. Also, by changing the $T_{ON}$-period in reverse proportion to the input voltage, it is possible to make the maximum output current constant against the over-current of output current. Moreover, if the secondary switching element 8 is turned on in synchronism with the turning off of the switching element 4, the secondary current all flow to the switching element 8, thus no rectifying diode 7 is required. Similarly, if the synchronizing oscillation circuit 6 is turned on in synchronism with the turning off of the switching element 8, no diode 5 is required.

Figure 12:
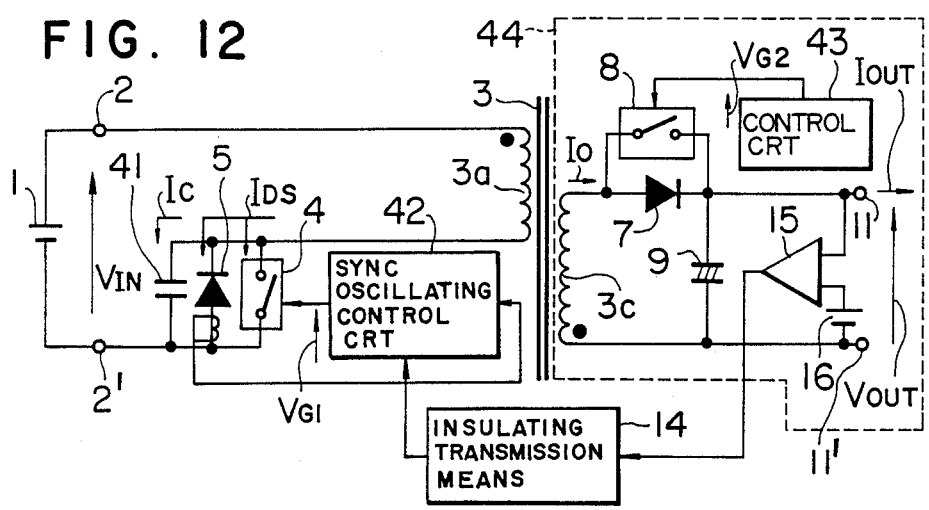
Figure 24:
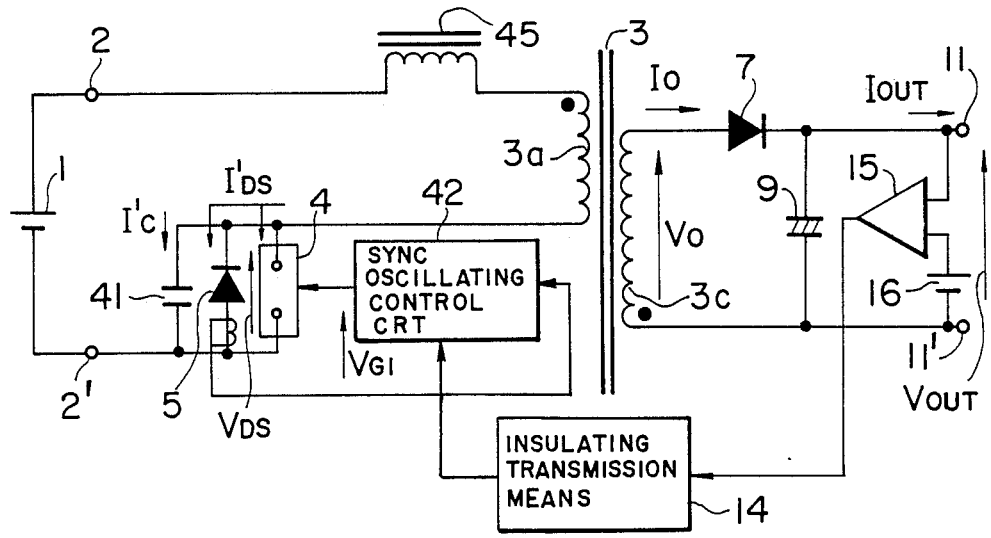
FIG. 24 is a circuit diagram of another conventional switching power supply.
Figure 23:
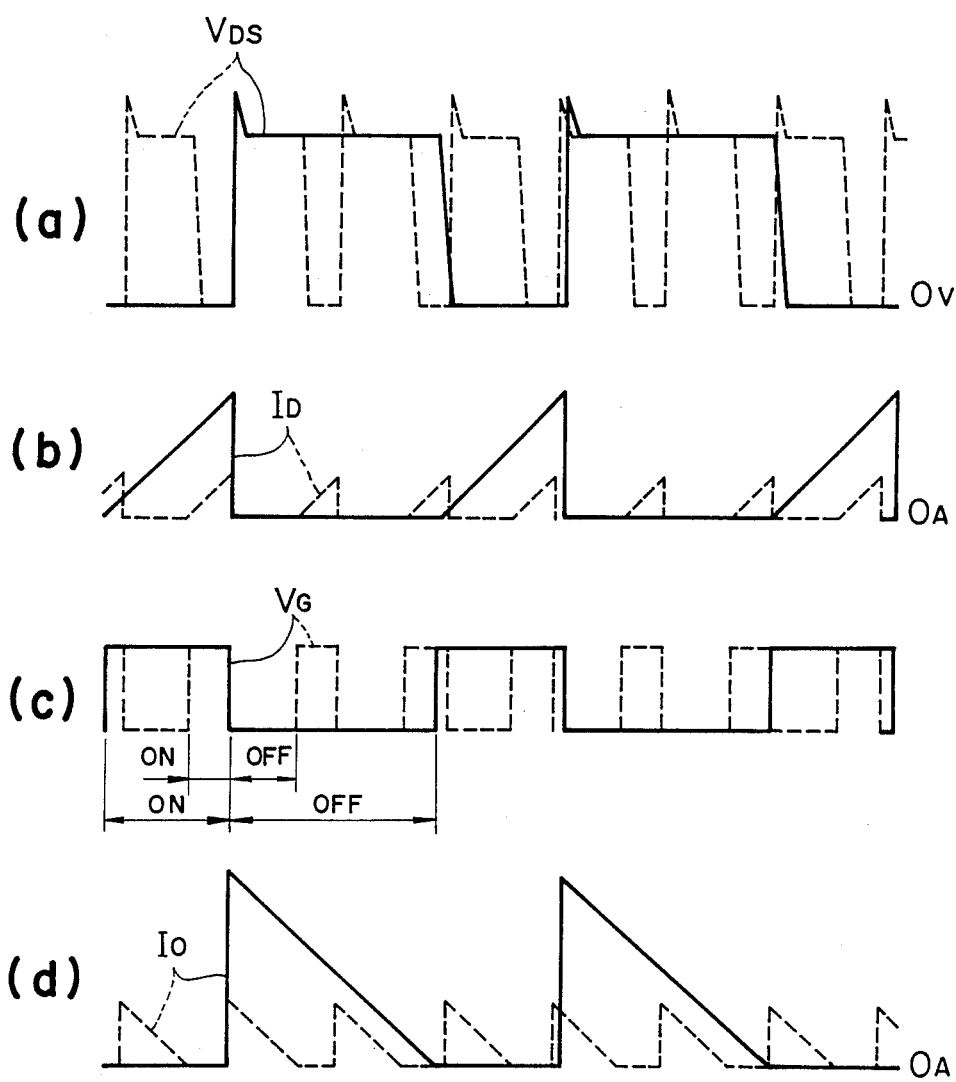
FIG. 23 is a graph showing the operating waveforms in the conventional circuit arrangement in FIG. 22.
Figure 25:
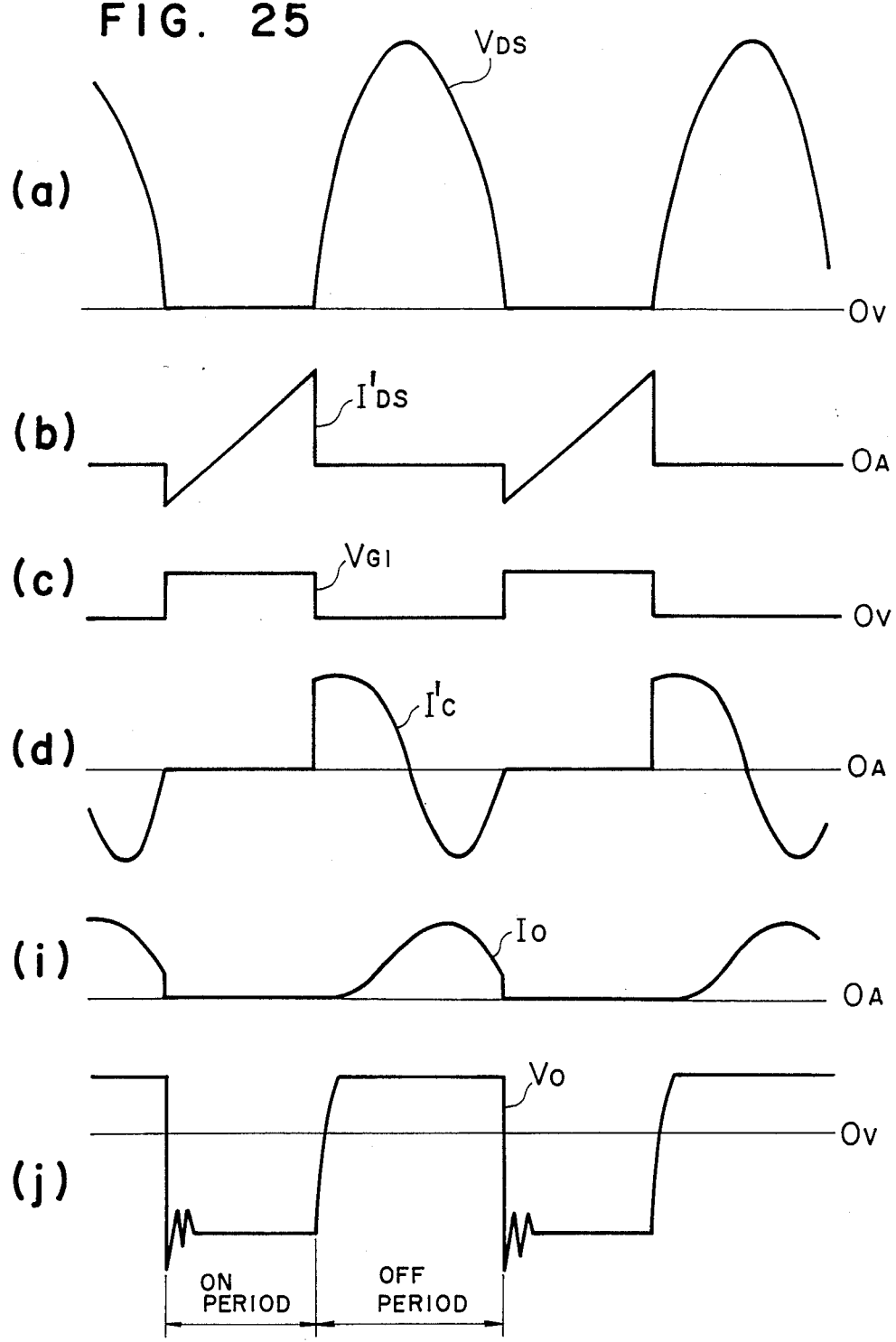
FIG. 25 is a graph showing the operating waveforms in the conventional circuit arrangement in FIG. 24.

FIG. 12 shows further embodiment of this invention. In FIG. 12, like elements corresponding to those in FIG. 24 are identified by the same reference numerals and will not be described. Shown at 41 is a capacitor connected to the switching element 4, 42 a synchronizing oscillation control circuit, 43 a control circuit which determines the reverse current period in which the secondary current flows in the secondary switching element 8, and 44 a secondary side control block.

Figure 13:
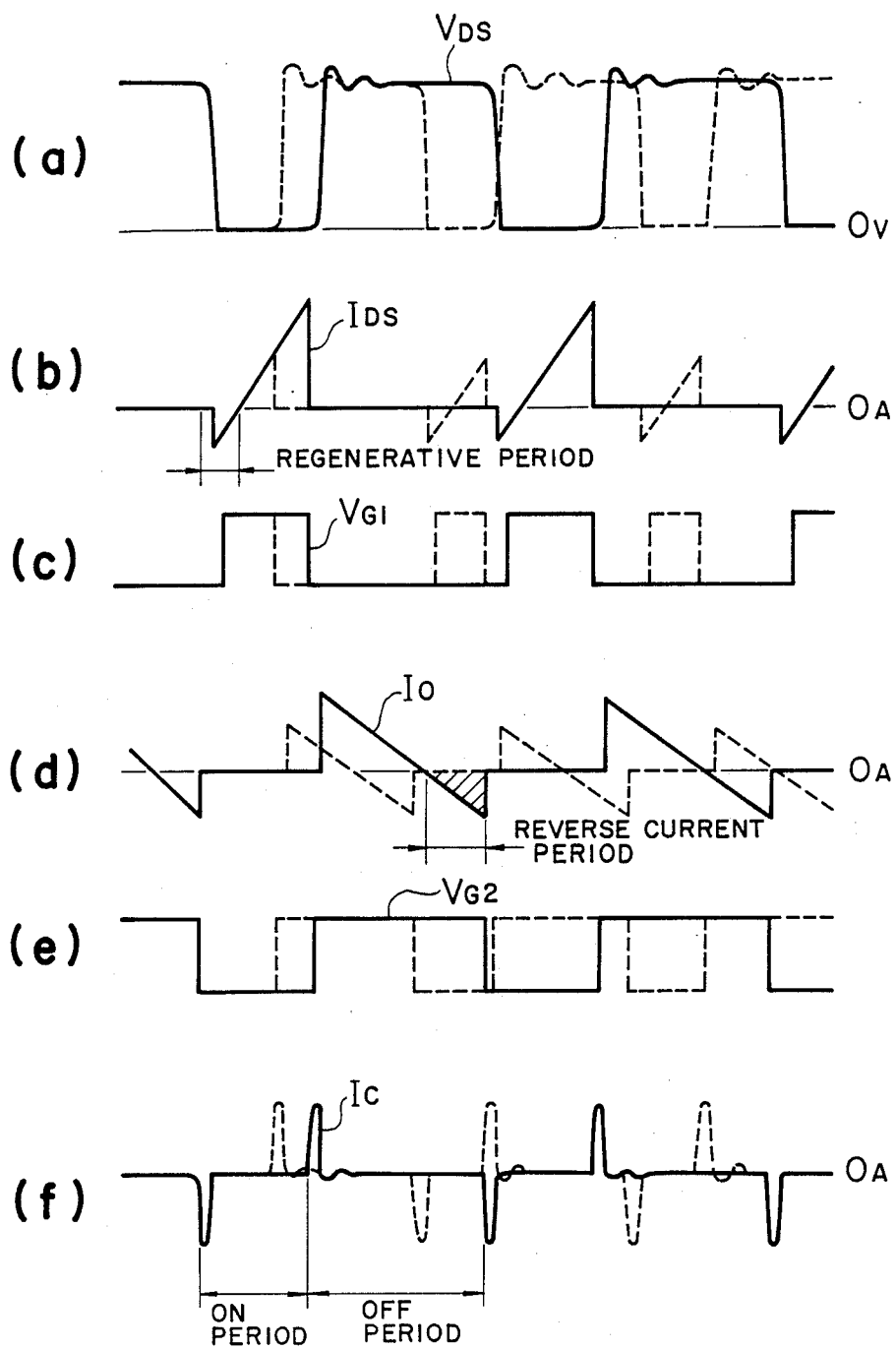
FIG. 13 is a waveform diagram showing the operating waveforms in the circuit arrangement of the invention in FIG. 12.

The operation will be described with reference to FIG. 13. In FIG. 13, at (a) is shown the voltage waveform $V_{DS}$ across the switching element 4, at (b) the current waveform $I_{DS}$ flowing in the switching element 4 and diode 5, at (c) the drive pulse waveform $V_{G1}$ to the synchronizing oscillation control circuit 42, at (d) the secondary current waveform $I_O$ flowing in the secondary winding 3c, at (e) the drive pulse waveform $V_{G2}$ from the control circuit 43, and at (f) the current waveform $I_C$ flowing through the capacitor 41. There are shown the released back period in which during the on-period the primary current flows through the primary current 3a to the DC power supply 1, and the reverse current period in which during the off-period the secondary current flows in the secondary winding 3c as indicated by the shaded area. In addition, in FIG. 13, the solid lines indicate the condition in which the output current $I_{OUT}$ flows and the broken lines shown the change of each waveform under the so-called no-load state in which no output current flows.

When the switching element 4 is turned off by the off-signal from the synchronizing oscillation control circuit 42, a voltage with a polarity opposite to the polarity in the on-period, or a flyback voltage, is induced in the primary winding 3a by the capacitor 41 connected in parallel with the switching element 4. In this case, the increase of the flyback voltage is made relatively gentle by the capacitor 41, or the rapid increase of the voltage to the switching element 4 is suppressed, resulting in a decrease of the turn-off loss. At the same time, a flyback voltage is induced in the secondary winding 3c to forward-bias the rectifying diode 7. Thus, the energy stored in the transformer 3 is released through the secondary winding 3c as the second current. When the secondary current released through the secondary winding 3c decreases to zero, a voltage across the smoothing capacitor 9, or the output voltage is supplied through the secondary switching element 8 which is already in the on-state, to the secondary winding 3c. Consequently, the secondary current flows from the smoothing capacitor 9 in the reverse direction toward the secondary winding c, so that magnetic flux is produced in the transformer 3 in the opposite direction to that mentioned above, or that energy is stored in the transformer. The control circuit 43 controls the reverse current period in which the secondary current flows in the reverse direction, and when the secondary switching element 8 is turned off, the polarity of the voltage induced in each winding of the transformer 3 is reversed. Thus, since the voltage induced in the secondary winding 3c reverse-biases the rectifying diode 7 and turns off the secondary switching element 8, the voltage induced in the primary winding 3a is in the direction in which the negative voltage is applied to the connection point between the capacitor 41 and the one end of the primary winding 3a and the positive voltage to the connection point between the input terminal 2 and the other end of the primary winding 3a. Therefore, the charge stored in the capacitor 41 is discharged, and thus the primary current flows to charge the DC power supply 1, or the energy stored in the reverse current period is released back to the power supply 1. When, by this operation, the voltage across the capacitor 41 is reduced to zero, the primary current further flows until the energy stored in the reverse current period becomes zero, this period being called the released-back (regenerative) period. At this time, the synchronizing oscillation control circuit 42 detects the current flowing in the diode 5 and turns on the switching element 4, but since the voltage across the capacitor 41 is already zero in the released-back period, no loss is caused when the switching element 4 is turned on, or the so-called zero-cross switching is brought about.

The operation in which the output voltage is controlled to be stabilized is the same as described with reference to FIG. 1, and will not be described.

The reverse current period $T_{OFF'}$ 43 in FIG. 12 is selected to be a value at which the voltage across the capacitor 41 can be completely reduced to zero during the regenerative period $T_{ON'}$ by discharge, and thus it is fixed or made variable by the capacitance value, input voltage and flyback voltage. The capacitor 41 connected across the switching element 4 prevents the rapid increase of voltage when the switching element 4 turns off, thus decreasing the turn-off loss. In addition, since the spike voltage generated by the leakage inductance of the transformer 3 is absorbed, the voltage to be applied is low. Also, at the time of turn-off, the zero-cross switching is brought about, causing no turn-off loss. Furthermore, since the charge stored in the capacitor 41 and the energy restored in the transformer 3 in the reverse-current period are all released-back to the DC power supply 1, almost no loss is caused and, since the steep change of voltage waveform can be prevented, the switching noise is greatly reduced.

Figure 14:
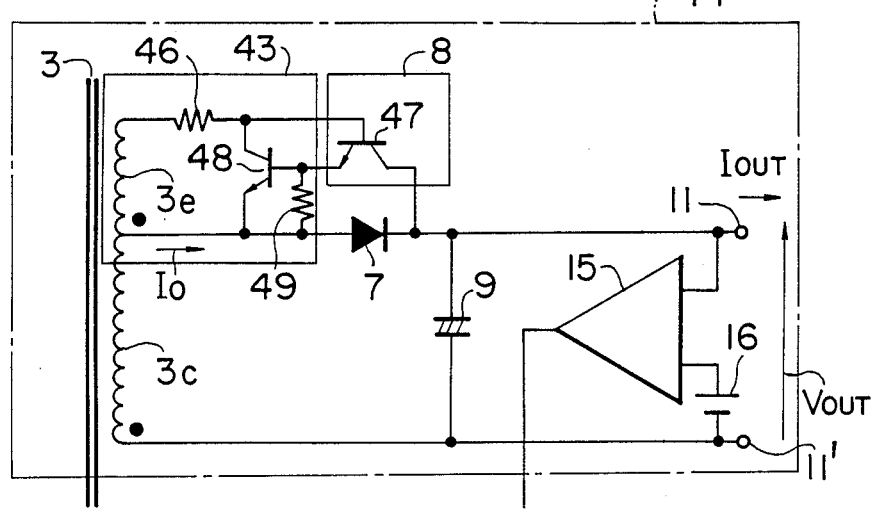
FIG. 14 is a specific circuit diagram of the secondary control block of the invention shown in FIG. 12.

FIG. 14 shows a specific circuit arrangement of the secondary-side control circuit 43 of the embodiment of this invention in FIG. 12. In this figure, like elements corresponding to those in FIG. 12 are identified by the same reference numerals and will not be described.

In FIG. 14, at 3e is shown a drive winding one end of which is connected to the secondary winding 3c of the transformer 3, and the other end of which is connected to the base of a BPT 47 through a resistor 46. The BPT 47 has its collector connected to the cathode of the diode 7 and its emitter connected through a resistor 49 to the anode of the diode 7. Shown at 48 is a BPT which has its base connected to the connection point between the resistor 49 and the emitter of the BPT 47, its collector connected to the connection point between the resistor 46 and the base of the BPT 47, and its emitter connected to the connection point between the diode 7 and the resistor 49.

The operation of the embodiment of FIG. 14 is the same as that described with reference to FIG. 5. That is, when the switching element 4 is turned off, part of the energy stored in the transformer 3 is released through the secondary winding 3c to the output terminals 11, 11' as the secondary current. At this time, a voltage is induced in the drive winding 3e to cause a drive current to flow through the resistor 46 to the base of the BPT 47, thus turning the BPT 47 on. However, almost all the secondary current released from the secondary winding 3c flows in the diode 7. When the energy stored in the transformer is released, the output voltage $V_{OUT}$ is applied through the resistor 49 and the BPT 47 which is already on, to the secondary winding 3c. At this time, the current flowing in the secondary winding 3c during the reverse current period $T_{OFF'}$ is linearly increased as determined by $$\text{secondary current } I_{O'} = \frac{V_{OUT}}{L_S} \times T_{OFF'}$$

Across the resistor 49 is developed a voltage which is proportional to the secondary current. Thus, when the voltage across the resistor 49 reaches a voltage by which the base-emitter path of the BPT 48 connected across the resistor 49 is forward-biased, the BPT 48 is turned on, shorting the base of the BPT 47, so the BPT is turned off. If the BPT 47 is turned off, the polarity of the voltage induced in each winding of the transformer 3 is reversed, so that a voltage is induced in the drive winding 3e to reverse-bias the base of the BPT 47, and thus to maintain the BPT 47 in the off-state. The reverse current period $T_{OFF'}$ determined by this operation is given as $$T_{OFF'} = \frac{V_{BE}}{R_{49}} \times \frac{L_S}{V_{OUT}}$$

where $V_{BE}$ is the forward threshold voltage between the base and emitter of the BPT 48, and R49 is the resistance value of the resistor 49.

In FIG. 12, if at least one winding of the multiple output construction having a plurality of secondary windings in the transformer 3 is provided with the same arrangement, the same result can be obtained as will be easily understood from the above description. Moreover, by connecting across the primary winding of the transformer 3 the capacitor 41 which is connected in parallel with the switching element 4, it is possible to obtain the same result.

Figure 15:
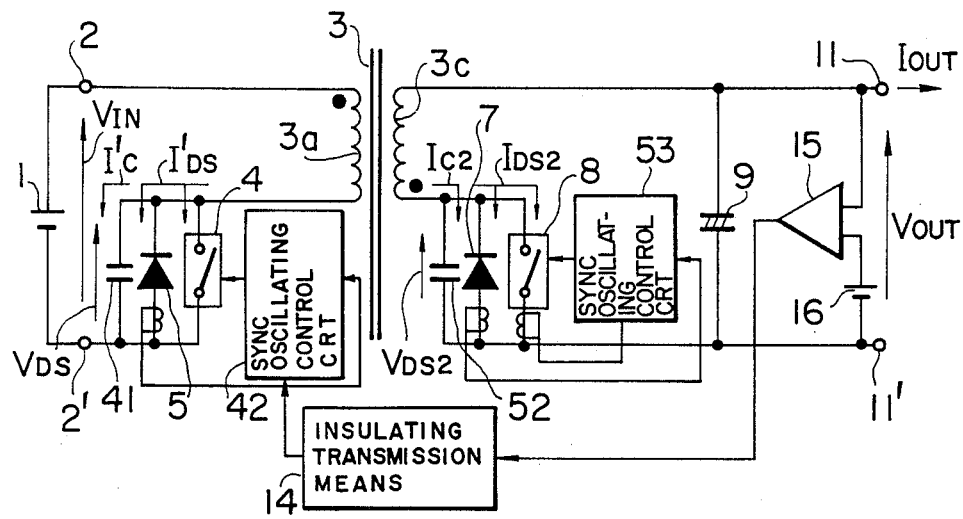
FIGS. 15 to 16 are circuit diagrams of other embodiments of the switching power supply of this invention.

FIG. 15 shows further embodiment of this invention. In FIG. 15, like elements corresponding to those in FIG. 12 are identified by the same reference numerals and will not be described. Shown at 52 is a capacitor, which is connected across the rectifying diode 7 so as to absorb the spike voltage generated by the leakage inductance of the secondary winding 3c and primary winding 3a of the transformer 3 which voltage is applied thereacross when the secondary switching element 8 is turned off. The secondary switching element 8 is turned on and off by a secondary synchronizing oscillation control circuit 53. The secondary synchronizing oscillation circuit 53 generates a drive on-off signal to the secondary switching element 8, detects that current is flows in the rectifying diode 7, and detects the current in the secondary switching element 8 so as to maintain the current to flow until the current flowing from the secondary winding 3c to the output terminal 11' exceeds a constant value.

The operation of the embodiment of FIG. 15 as to the secondary winding side is the same as that in the primary winding side of the embodiment of FIG. 12. Since the capacitors 41, 52 are respectively connected on the primary and secondary winding side of the transformer 3, they absorb the spike voltages induced in the primary winding 3a and secondary winding 3c due to the leakage inductance of the transformer 3 and simultaneously prevents abrupt increase of the induced voltage, so that the switching noise caused in the primary winding 3a and secondary winding 3c of the transformer 3 can be reduced further. Moreover, since the energy absorbed and stored in the capacitors 41, 52 are all released back, or recovered to the input and output, no loss is produced. Also, since the zero-cross switching is brought about when the switching element 4 and the secondary switching element 8 are turned on, the turn-on loss is not caused, and since the abrupt increase of the applied voltage is prevented upon turning-off, the turn-off loss can be reduced.

While in the embodiments of FIGS. 12 and 15, the control circuit 43 and the secondary synchronizing oscillation control circuit 53 are operated to maintain the secondary current flowing the secondary switching element 8 constant, the output voltage control may be performed as in FIG. 1, and in this case the insulating transmission means 14 can be omitted.

Figure 16:
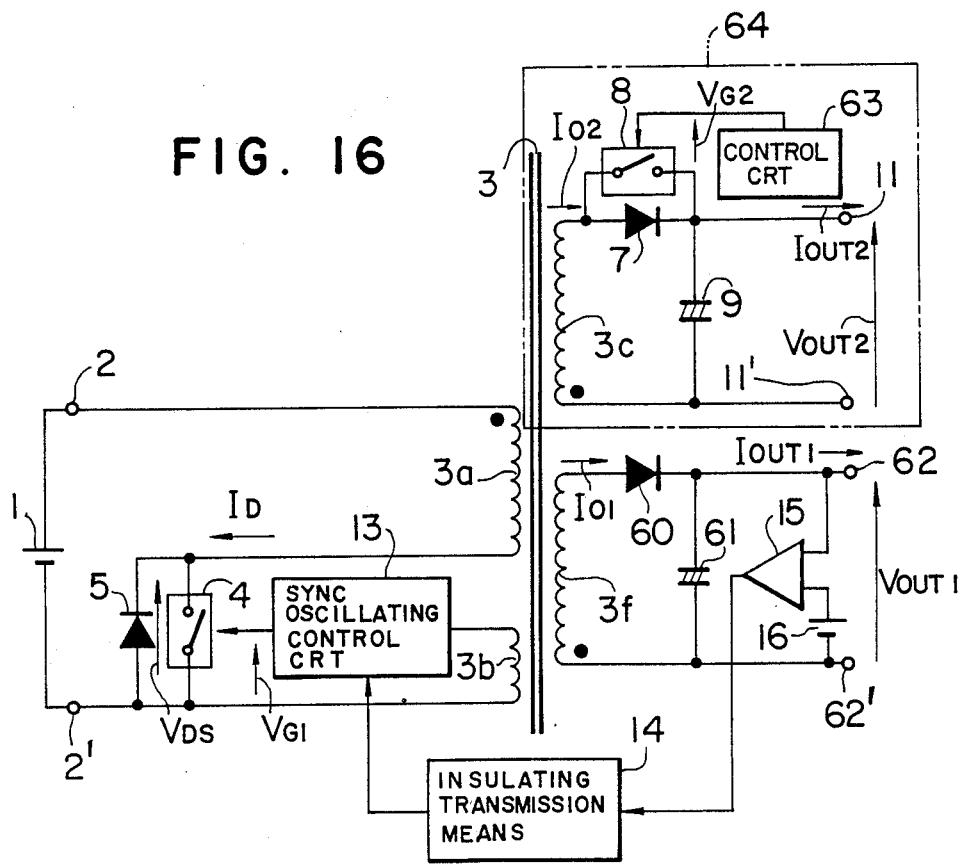
Figure 26:
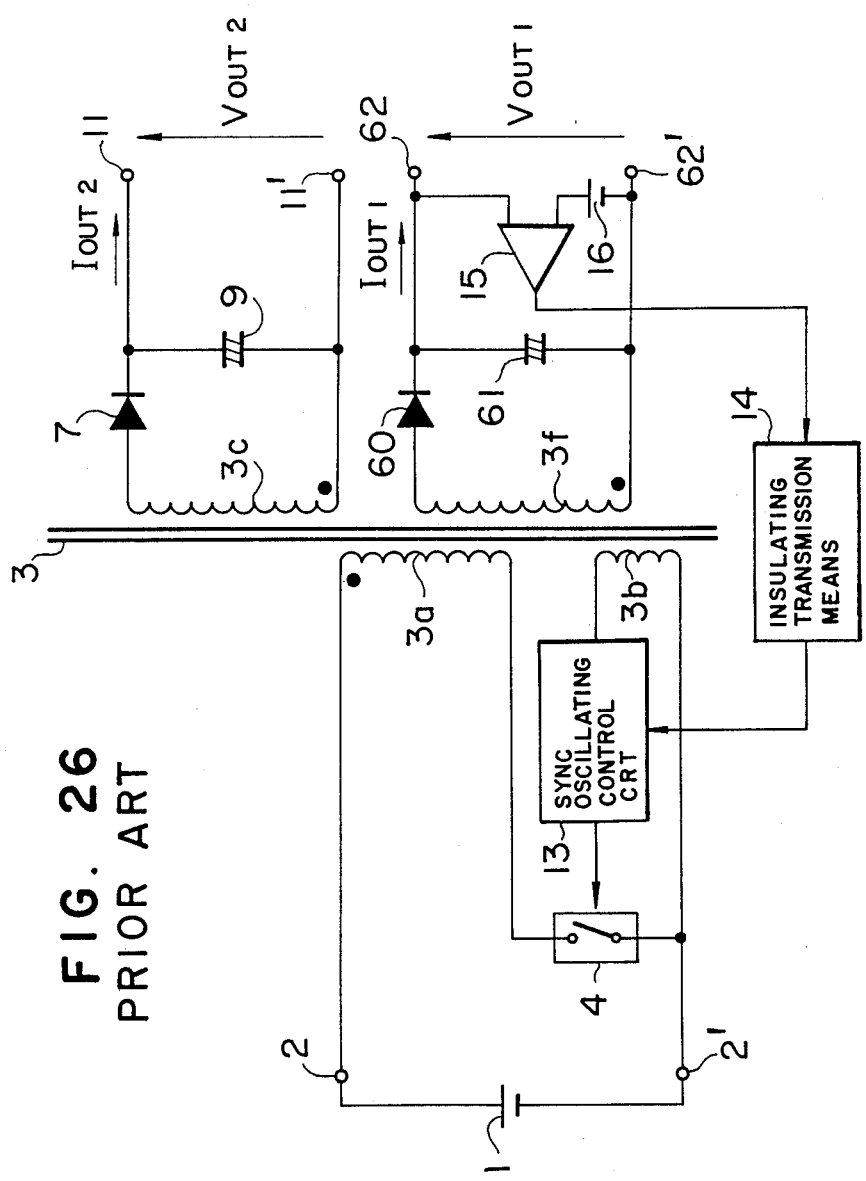
FIG. 26 is a circuit arrangement of still another conventional switching power supply.

FIG. 16 shows still further embodiment of this invention. In FIG. 16, like elements corresponding to those in FIGS. 1 and 26 are identified by the same reference numerals. Shown at 3f is a secondary winding which is wound on the transformer 3 and supplies the output voltage to the output terminals 62, 62' through the rectifying diode 60 and smoothing capacitor 61. Shown at 63 is a control circuit which determines the revers current period in which the secondary current is flowed in the secondary switching element 8, and at 64 is a non-control output block.

Figure 17:
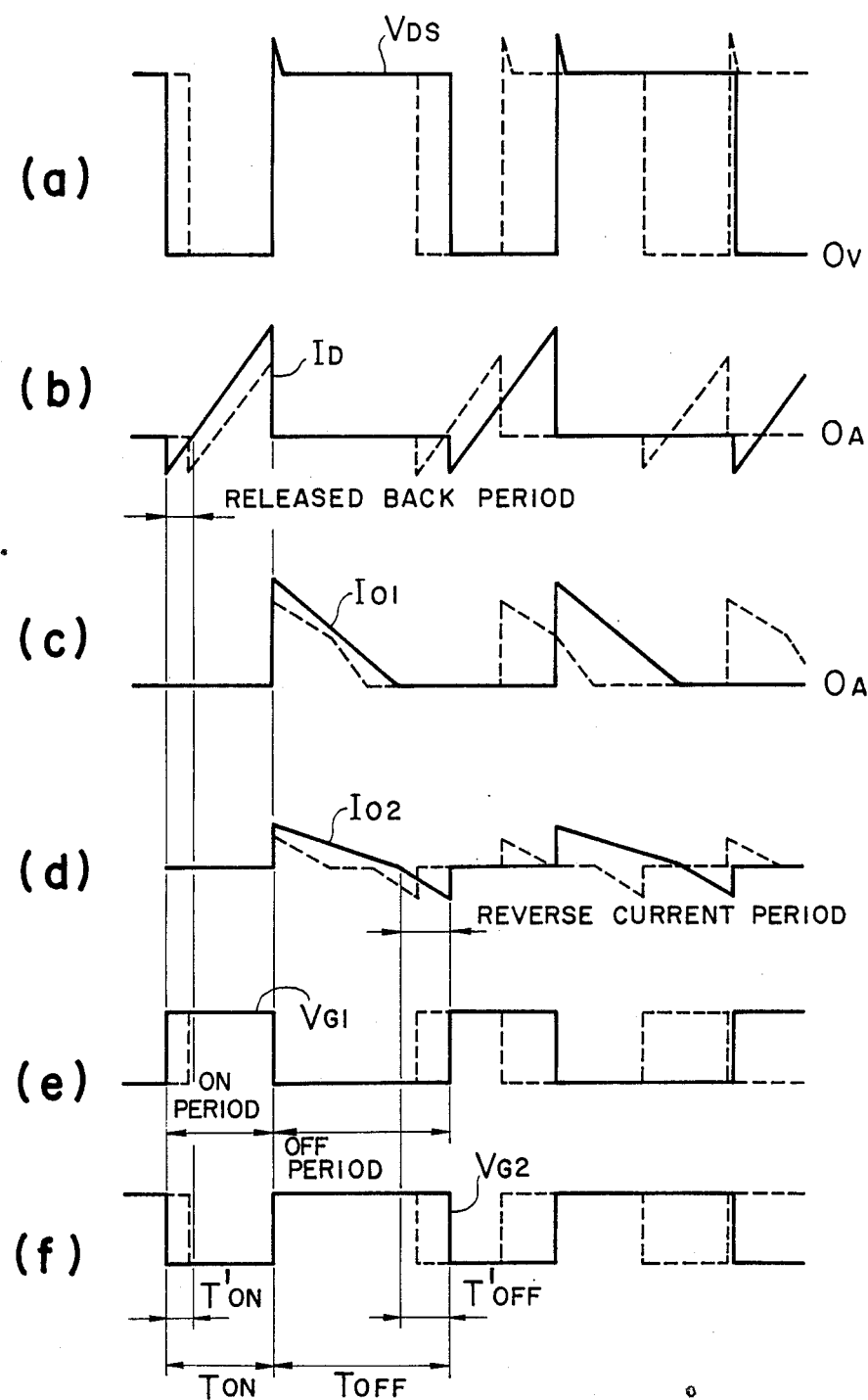
FIG. 17 is a waveform diagram showing the operating waveforms in the circuit arrangement of the invention in FIG. 16.

The operation will be described in detail with reference to FIG. 17. In FIG. 17 at (a) is shown the voltage waveform $V_{DS}$ across the switching element 4, at (b) the primary current $I_D$ flowing in the primary winding 3a, at (c) the secondary current waveform $I_{O2}$ flowing in the secondary winding 3f, at (d) the secondary current waveform $I_{O2}$ flowing in the secondary winding 3c, at (e) the drive pulse waveform $V_{G1}$ from the synchronizing oscillation control circuit 13, at (f) the drive pulse waveform $V_{G2}$ to the secondary switching element 8 to be controlled by the control circuit 63, in which the shaded area is the reverse current period in which the secondary winding 3c in the off-period. Also in FIG. 17 the solid line shows that the output current $I_{OUT2}$ is much flowed from the output terminals 11, 11' and the broken line indicates that the output current $I_{OUT2}$ is a little flowed from the output terminals 11, 11'. In this case, the output current $I_{OUT1}$ flowing out of the output terminals 62, 62' is constant.

The operation in which the output voltage $V_{OUT1}$ at the output terminals 62, 62' is controlled to be stabilized is already mentioned in detail with reference to the prior art of FIG. 26, and will not be described. The operation in which the output voltage $V_{OUT2}$ at the output terminals 11, 11' is controlled to be stabilized will be mentioned in detail with reference to FIG. 18.

Figure 18:
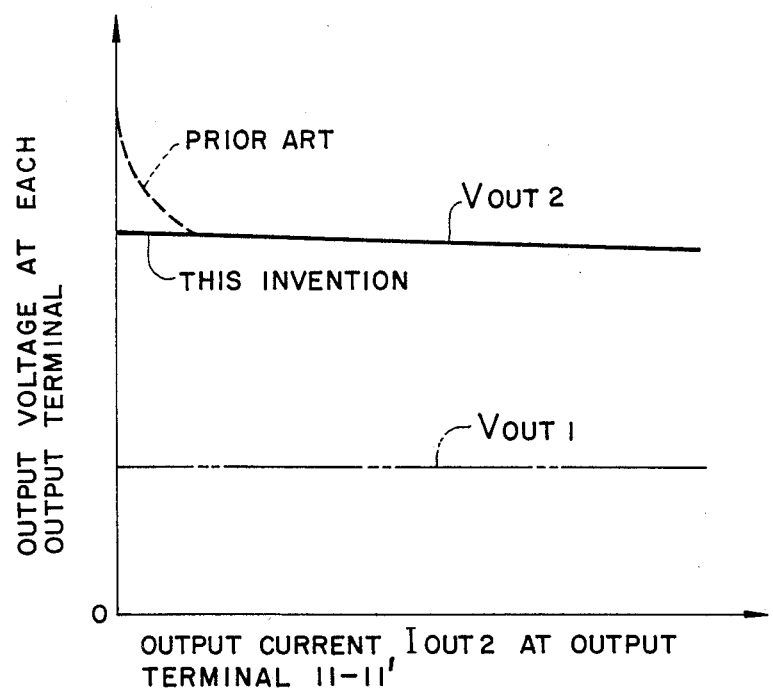
FIG. 18 is a graph showing the output characteristic of the power supply of the invention in FIG. 16.

FIG. 18 is a graph of the output voltages $V_{OUT1}$ and $V_{OUT2}$ relative to the output current $I_{OUT2}$ at the output terminals 11, 11' with the output Current $I_{OUT1}$ at the output terminals 62, 62' made constant. In FIG. 18, the solid line indicates the output characteristic according to this invention and the broken line indicates the characteristic in the prior art. The output voltage $V_{OUT1}$ is not changed because it is always controlled in both invention and prior art.

The energy supplied from the secondary winding 3c of the transformer 3 is used as output current $I_{OUT2}$ from the output terminals 11, 11' and also, part thereof is used as the current flowing in the secondary winding 3c through the secondary switching element 8 only during the reverse current period. For example, even if the output current $I_{OUT2}$ flowing out of the output terminal 11, 11' is stopped due to no load, the current during the reverse current period is always used, and thus equivalently a load is connected to bring the bleeder current $I_{OUT2}$ as expressed by $$I'_{OUT2} = \frac{1}{2} \times \frac{V_{OUT2}}{L_{S2}} \times \frac{(T_{OFF'})^2}{T}$$

where LS2 is the inductance of the secondary winding 3c and $T_{OFF'}$ is the reverse current period. Thus, the bleeder current $I'_{OUT2}$ can be adjusted by changing the reverse current period $T'_{OFF}$ by the control circuit 63, and if necessary the bleeder current $I'_{OUT2}$ can be set. AS described above, the current flowing in the secondary winding 3c in the reverse current period, or the bleeder current $I'_{OUT2}$ is stored in the transformer 3 in the form of energy and, when the second switching element 8 is turned on, it is released through the primary winding 3a back to the DC power supply 1. Thus, no loss is produced. The relation between the reverse current period $T_{OFF'}$ and the release back period $T_{ON'}$ is given as $$V_{OUT} = V_{IN} \times \frac{N_S}{N_P} \times \frac{T_{ON}'}{T_{OFF}'}$$

Thus, the output $V_{OUT2}$ at output terminals 11, can be prevented from increase even when the output current $I_{OUT2}$ decreases to zero as shown in FIG. 18.

Figure 19:
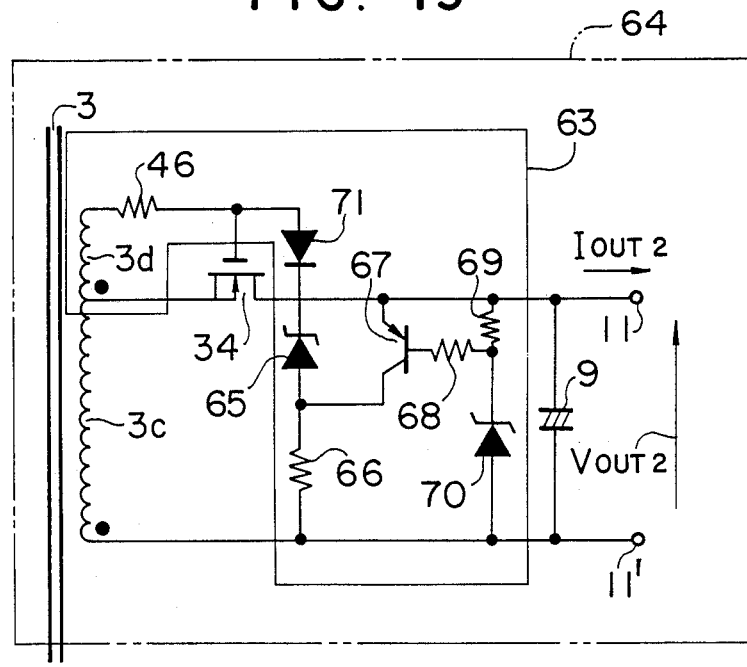
FIG. 19 is a circuit diagram of the secondaryside un-controlled block of this invention shown in FIG. 16.

The specific arrangements of the secondary switching element 38 and control circuit 63 and the same as that in FIG. 14 and will not be described. FIG. 19 shows another specific circuit arrangement of the non-control output block 64 in the embodiment of this invention shown in FIG. 16. In FIG. 19, like elements corresponding to those in FIG. 6 are identified by the same reference numerals. In FIG. 19 at 71 is shown a diode, at 65 and 68 are Zener diodes. At 66, 68 and 69 are resistors and at 67 is a BPT.

When the switching element 4 is turned off, a voltage is applied between the gate and source of the FET 34 from the secondary bias winding 3d through the resistor 46. The gate-source voltage $V_{GS}$ of the FET 34 is given as $$V_{GS} = V_e - \frac{(V_{OUT2} + V_e - V_z)}{R46 + R66} \times R46$$

because of the voltage division by diode 71, Zener diode 65 and resistor 66. If the values of the resistors 46 and 66 and the Zener diode 65 are set so that this voltage is lower than the gating threshold voltage Vth of the FET 34, the FET 34 stays turned off and only the diode built in the FET 34 operates as a normal rectifying diode with no reverse current period. In the above expression, Ve is the flyback voltage in the secondary bias winding 3d, Vz is the Zener voltage in the Zener diode 65, and R46 and R66 are the values of resistors 46 and 66.

However, when the output current $I_{OUT2}$ at the output terminals 11, 11' is decreased due to light load so that the output voltage $V_{OUT2}$ is increased to exceed the Zener voltage of the Zener diode 70, a drive current flows from the base of the BPT 67 through resistor 68, Zener diode 70, turning on the BPT 67 to increase the voltage across the resistor 66. Thus, the FET 34 has the applied gate-source voltage increased, and therefore the FET 34 is turned on. As a result, the reverse current period is produced to bring the bleeder current, by which the output voltage $V_{OUT2}$ is prevented from increase. Also in this case, even if the gate source voltage of the FET 34 becomes maximum, it is fixed to the Zener voltage of the Zener diode 65, with the result that the gate ca be protected and that the bleeder current can be prevented from limitless increase of the bleeder current.

Figure 20:
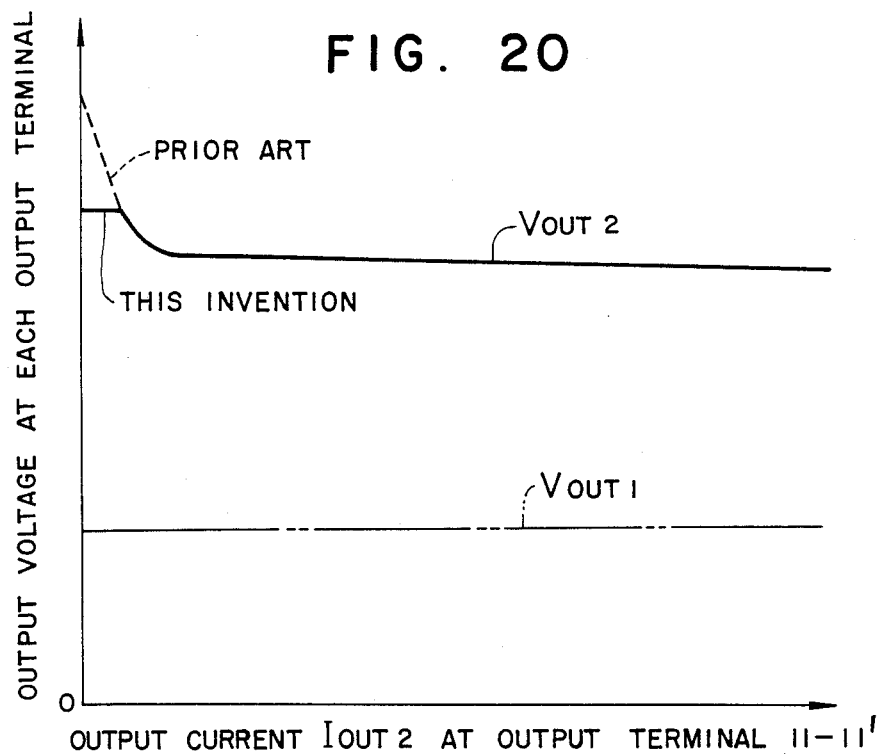
FIG. 20 is a graph showing the output characteristic of the power supply of the invention in FIG. 19.
Figure 21:
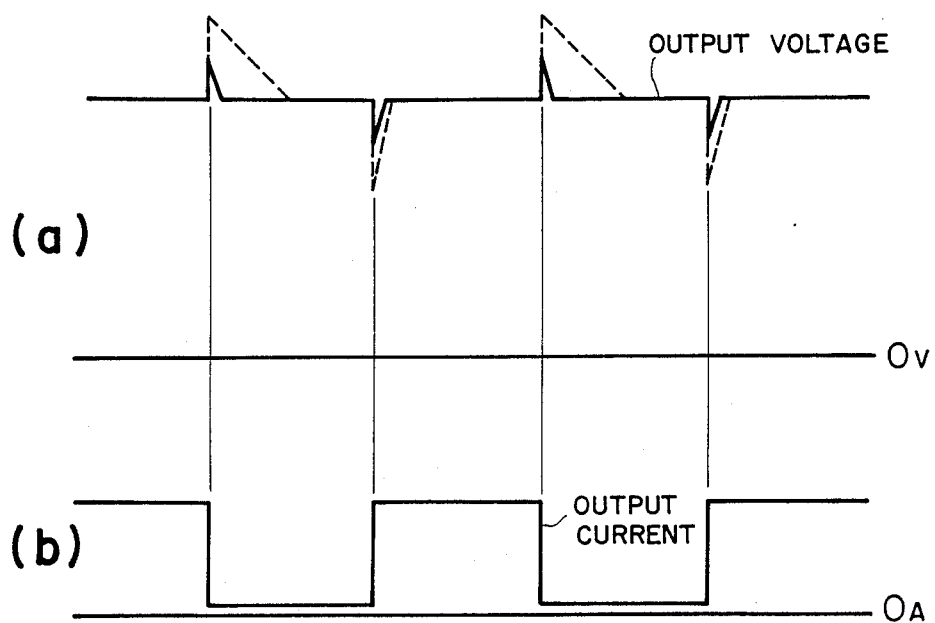
FIG. 21 is a diagram showing the effect of the invention.

FIG. 20 is a graph of the output voltage $V_{OUT2}$, showing the stabilized situation of the output voltage. The output voltage $V_{OUT2}$ can be set to an increase value by changing the Zener voltage of the Zener diode 70. If the output voltage $V_{OUT2}$ is smaller than the Zener voltage, no reverse current period is present and no bleeder current flows so that the output power corresponding to the bleeder current can be prevented from increase.

While in FIG. 16, the output voltage is stabilized by controlling the on-and off-periods of the switching element 4, the input voltage from the DC power supply 1 may be controlled by a regulator or the like for the stabilization of the output voltage. Also, it will be understood from the above description that except the direct detection of the output voltage for the control, a detection winding may be separately provided on the transformer 3 to produce a voltage same as the output voltage which detection winding voltage is controlled to be constant, or the so-called tertiary winding control system may be employed to stabilize the output voltage.

In addition, even if there are a plurality of non-control outputs a plurality of same circuit arrangements may be provided to achieve the same effect.

According to this invention, the on-period can be fixed to control the output voltage to be constant against the variations of the input voltage and output current, and the oscillation frequency variation can be greatly reduced. Particularly against the output current variation, the oscillation frequency is fixed, enabling high frequency operation and miniaturization of transformer and secondary rectifying and smoothing circuits. In addition, because of small frequency variation, the attenuation frequency band region of the noise filter can be narrowed, resulting in small size and low cost. Moreover, the transient variation of the output current can be removed. The reasons for the improvement of the transient response are that since the control operation is carried out only on the second winding side the signal transmission is simple resulting in fast response, and that particularly when the output voltage transiently increases, the smoothing capacitor is discharged from the output terminals as the output current while the output current $I_{OUT}$, as expressed by $$I_{OUT} = K \times (T_{OFF} - 2T_{OFF}'),$$

is negative when the reverse current period $T_{OFF}'$ is in the range of $T_{OFF} > T_{OFF}' > \frac{1}{2}T_{OFF}$, so that the output current can be recovered to the primary winding side, thus accelerating the discharge of the smoothing capacitor. In addition, there is no need to provide a special circuit for protecting against the short circuit between the output terminals and excessive output current. Since the on-period is also fixed against the transient response, the power supplied from the primary winding side is always made constant. Since the control signal is not required to be transmitted to the primary winding side, there is no need to provide insulating transmission means such as photocoupler, and this results in simple circuit construction, very high reliability and low cost.

Moreover, according to this invention, the control range is the same as in the prior art, the turn-on and turn-off loss of the switching element can be greatly decreased, and at the same time the spike voltage and spike current to be supplied to the switching element can be greatly reduced. In addition, since the switching noise occurring in the primary and secondary winding sides of the transformer can be decreased, it is possible to produce a switching power supply with high efficiency, low noise and good high frequency performance.

Furthermore, according to this invention, in the multiple output power supply which supplies power from a plurality of secondary windings of the same transformer, the output voltage under a light load in the un-controlled output can be prevented from increase by a relatively simple circuit, the stability of the uncontrolled output can be greatly improved, and the bleeder current for prevention against light load is flowed through the primary winding back to the DC power supply, thus resulting in almost no loss and high efficiency in the switching power supply.

We claim:

1. A switching power supply comprising:
   first switching means connected to receive an applied input voltage and for providing an output at which said input voltage is switched on and off;
   a transformer having a primary winding connected to the output of said first switching means;
   first rectifying and smoothing means connected to a secondary winding of said transformer; and
   second switching means operative alternately with respect to said first switching means for releasing the output of said first rectifying and smoothing means back to said secondary winding of said transformer during the off-period of said first switching means, whereby the output of said first rectifying and smoothing means which is applied to said secondary winding is released back to said primary winding of said transformer, and wherein said second switching means is controlled by the output of said first rectifying and smoothing means.

2. A switching power supply according to claim 1, wherein said second switching means is connected in parallel with the first rectifying means of said first rectifying and smoothing means.

3. A switching power supply according to claim 2, wherein said second switching means is formed at an FET which also serves as said first rectifying means of said first rectifying and smoothing means.

4. A switching power supply according to claim 1, wherein said primary winding is connected with a second rectifying means for allowing the energy released back to said primary winding to flow therein, and capacitors are connected in parallel with said first and second switching means respectively.

5. A switching power supply according to claim 4, wherein said second rectifying means and said first switching means are formed of a single FET.

6. A switching power supply according to claim 1, wherein said second switching means is connected to a separate secondary winding which is connected to said first rectifying and smoothing means.

7. A switching power supply according to claim 1, wherein said transformer is formed of an inductance element.

8. A switching power supply comprising:
   first switching means connected to receive an applied input voltage and providing an output at which said input voltage is switched on and off;
   a transformer having a primary winding connected to the output of said first switching means;
   first and second rectifying and smoothing means connected to first and second secondary windings of said transformer;
   second switching means operative alternately with respect to said first switching means for releasing the output of said first rectifying and smoothing means back to said first secondary winding of said transformer during the off-period of said first switching means; and
   control means for controlling said first switching means by the output of said second rectifying and smoothing means;
   whereby the output of said first rectifying and smoothing means supplied through said second switching means to said first secondary winding is released back to said primary winding of said transformer.

9. A switching power supply according to claim 8, wherein said primary winding is connected with rectifying means for allowing the energy released back to said secondary winding to flow therein.

10. A switching power supply according to claim 8, wherein capacitors are connected in parallel with said first and second switching means respectively.

* * * * *